United States Patent
Xia et al.

(10) Patent No.: US 10,045,316 B2
(45) Date of Patent: Aug. 7, 2018

(54) METHOD AND DEVICE FOR SENDING SYNCHRONIZATION SIGNAL AND METHOD AND DEVICE FOR SYNCHRONIZATION BETWEEN BASE STATIONS

(71) Applicant: HUAWEI TECHNOLOGIES CO., LTD., Shenzhen (CN)

(72) Inventors: Yuan Xia, Beijing (CN); Juan Zheng, Beijing (CN); Xiaoan Fan, Beijing (CN); Sha Ma, Beijing (CN); Qiang Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 14/993,381

(22) Filed: Jan. 12, 2016

(65) Prior Publication Data

US 2016/0157196 A1   Jun. 2, 2016

Related U.S. Application Data

(63) Continuation of application No. PCT/CN2014/071754, filed on Jan. 29, 2014.

(30) Foreign Application Priority Data

Jul. 12, 2013   (WO) ................ PCT/CN2013/079334

(51) Int. Cl.
*H04W 56/00*   (2009.01)
*H04L 5/00*    (2006.01)
(Continued)

(52) U.S. Cl.
CPC ......... *H04W 56/001* (2013.01); *H04L 5/0048* (2013.01); *H04W 28/04* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2011/0171949 A1 | 7/2011 | Liao et al. | |
| 2012/0134455 A1* | 5/2012 | Wang ................ | H04W 56/0015 375/354 |

(Continued)

FOREIGN PATENT DOCUMENTS

| | | |
|---|---|---|
| CN | 102017738 A | 4/2011 |
| CN | 102271391 A | 12/2011 |

OTHER PUBLICATIONS

Extended European Search Report dated May 31, 2016 in corresponding European Patent Application No. 14822718.4.

(Continued)

*Primary Examiner* — Ayanah George
(74) *Attorney, Agent, or Firm* — Staas & Halsey LLP

(57) ABSTRACT

A method and device for sending a synchronization signal and a method and device for synchronization between base stations, include: determining, by a synchronization source base station according to a synchronization level of the synchronization source base station, a resource for sending an NLRS for clock synchronization between base stations, and according to the determined resource. In this way, one NLRS for clock synchronization between base stations is configured on each synchronization source base station, and the NLRS is sent on a resource determined according to a synchronization level, so that a synchronization base station that acquires the NLRS can determine the synchronization level of the synchronization source base station according to a resource for sending the NLRS.

18 Claims, 9 Drawing Sheets

(51) Int. Cl.
*H04W 28/04* (2009.01)
*H04W 84/04* (2009.01)

(56) References Cited

U.S. PATENT DOCUMENTS

2012/0224533 A1* 9/2012 Lin .................... H04W 56/002
370/328
2013/0010658 A1   1/2013 Zhu
2015/0163762 A1   6/2015 Fu

OTHER PUBLICATIONS

International Search Report dated Apr. 16, 2014 in corresponding International Patent Application No. PCT/CN2013/079334.
"Support for time and frequency synchronization using network listening", 3GPP TSG RAN WG2 Meeting #67bis, Oct. 12-16, 2009, Miyazaki, Japan, R2-095423, 3 pages.
"Enhanced mechanisms for network listening", 3GPP TSG RAN WG1 Meeting #75, Nov. 11-15, 2013, San Francisco, USA, R1-135038, 5 pages.
"3$^{rd}$ Generation Partnership Project; Technical Specification Group Radio Access Network; Evolved Universal Terrestrial Radio Access (E-UTRA); TDD Home eNode B (HeNB) Radio Frequency (RF) requirements analysis (Release 11)", 3GPP TR 36.922 V11.0.0, Sep. 2012, Valbonne, France, 74 pages.
"3rd Generation Partnership Project; Technical Specification Group Radio Access Network; Scenarios and requirements for small cell enhancements for E-UTRA and E-UTRAN (Release 12)", 3GPP TR 36.932 V12.1.0, Mar. 2013, Valbonne, France, 14 pages.
International Search Report dated May 8, 2014, in corresponding International Application No. PCT/CN2014/071754.

* cited by examiner

METHOD AND DEVICE FOR SENDING SYNCHRONIZATION SIGNAL AND METHOD AND DEVICE FOR SYNCHRONIZATION BETWEEN BASE STATIONS

CROSS-REFERENCE TO RELATED APPLICATIONS

This application is a continuation of International Application No. PCT/CN2014/071754, filed on Jan. 29, 2014, which claims priority to International Application No. PCT/CN2013/079334, filed on Jul. 12, 2013, both of which are hereby incorporated by reference in their entireties.

TECHNICAL FIELD

Embodiments of the present invention relate to the field of wireless communications, and in particular, to a method and device for sending a synchronization signal and a method and device for synchronization between base stations.

BACKGROUND

To cope with the rapid growth of traffic demands for data services, on the basis of a cellular network of a conventional macro base station, a large number of femto base stations, for example, Small cell small cell base stations and femto cell base stations are densely deployed in some indoor or outdoor hot spots. The femto base station is characterized by a small coverage area and low transmit power, is suitable for providing high-rate data transmission services, and can offload data traffic of a macro cellular network, thereby reducing a network deployment cost of a carrier.

However, to ensure normal data transmission between a macro base station and femto base stations, clock synchronization needs to be implemented between the femto base stations and between the femto base stations and the macro base station.

To identify synchronization states of the femto base stations, a synchronization level of each femto base station is predefined. FIG. 1 is a schematic structural diagram of a multi-hop synchronization system.

As can be seen from FIG. 1, a macro base station acquires timing synchronization information from a global positioning system (GPS), that is, a synchronization level is set to 0; femto base station 1 obtains timing synchronization information from the macro base station, that is, a synchronization level is set to 1; femto base station 2 obtains timing synchronization information from femto base station 1, that is, a synchronization level is set to 2; . . . ; and femto base station M obtains timing synchronization information from femto base station M−1, that is, a synchronization level is set to M.

A femto base station that acquires synchronization information from another base station is referred to as a synchronization base station, and a base station that provides another base station with synchronization information is referred to as a synchronization source base station. For example, the macro base station provides femto base station 1 with synchronization information, the macro base station is a synchronization source base station for femto base station 1, and femto base station 1 is a synchronization base station for the macro base station. Femto base station 1 provides femto base station 2 with synchronization information, femto base station 1 is a synchronization source base station for femto base station 2, and femto base station 2 is a synchronization base station for femto base station 1. It can therefore be seen that in a wireless communications system, any base station may be a synchronization base station, or may be a synchronization source base station.

Using the multi-hop synchronization system mode for synchronization between base stations in a communications network system is subject to the following defect: When more synchronization levels are involved in synchronization information, the synchronization error also increases gradually; therefore, a relatively large synchronization error is caused between a base station having a high synchronization level and a base station having a low synchronization level, resulting in relatively low accuracy in synchronization between base stations in a communications system.

In consideration of factors such as deployment scenario, cost, and implementation complexity, in a group of femto base stations that are deployed densely, synchronization information may be acquired in manners such as network listening and blind detection, so as to implement clock synchronization. That is, a synchronization base station tracks a synchronization source base station by means of network listening, and acquires synchronization information of the synchronization source base station in a blind detection manner, so as to implement clock synchronization between the synchronization base station and the synchronization source base station.

For example, first, a synchronization base station measures, by means of network listening, a common reference signal (CRS) of a synchronization source base station that carries clock synchronization information; next, the synchronization base station determines, according to the common reference signal obtained by listening, in a resource (including multiple subframes) used for sending the common reference signal, a subframe that carries a CRS sequence and a subframe that does not carry a CRS sequence; and furthermore, the synchronization base station further detects a position of a carrier resource of the subframe that does not carry a CRS sequence, and determines a synchronization level of the synchronization source base station according to the detected position of the carrier resource.

For example, a synchronization source base station sends a common reference signal, and a subframe that does not carry a CRS sequence is carried at position 1 of a carrier resource for sending the common reference signal, or it may also be defined that a synchronization level of the synchronization source base station is 1; and when a synchronization base station detects, according to the received common reference signal of the synchronization source base station, that the position of the carrier resource of the subframe that does not carry a CRS sequence is 1, it is determined that a synchronization level of a synchronization source base station that receives the common reference signal is 1.

When a synchronization level of a synchronization source base station is acquired in the above manner, the following defect exists:

On some synchronization source base stations, a multimedia broadcast multicast service (MBMS) is configured, but a CRS signal is not configured. When a synchronization base station still detects a position of a carrier resource of a subframe that does not carry a CRS sequence to determine a synchronization level of the synchronization source base station, because no CRS signal is configured on the synchronization source base station, a position that carries a carrier resource for sending MBMS is liable to be determined as a position of a carrier resource of a subframe that does not carry a CRS sequence, and the synchronization level of the synchronization source base station is determined according to the position of the carrier resource configured to send MBMS. For example, a synchronization level of a synchronization source base station is 1, but position 2 is configured as a position of a carrier resource for sending MBMS, so that a synchronization base station determines, according to the detected position 2 of the carrier resource for sending MBMS, that the synchronization level of the synchronization source base station is 2. This will result in occurrence of an error in determining the synchronization level, which directly affects synchronization information acquired by the synchronization base station, and reduces accuracy that the synchronization base station performs synchronization tracking.

SUMMARY

Embodiments of the present invention provide a method and device for sending a synchronization signal and a method and device for synchronization between base stations, so as to solve a problem of low accuracy of synchronization tracking that exists when a synchronization base station performs synchronization between base stations.

According to a first aspect of the present invention, a method for sending a synchronization signal is provided, including:

determining, by a base station according to a synchronization level of the base station, a resource for sending a network listening reference signal NLRS, where the NLRS is used for clock synchronization between base stations; and sending, by the base station, the NLRS according to the determined resource.

Among possible implementation manners of the first aspect, in a first possible implementation manner, the determining, by a base station according to a synchronization level of the base station, a resource for sending a network listening reference signal NLRS specifically includes:

determining, by the base station according to the synchronization level of the base station and a mapping relationship between the synchronization level and a resource for sending an NLRS, the resource for sending the NLRS.

In the first possible implementation manner of the first aspect, in a second possible implementation manner, the mapping relationship between the synchronization level and a resource for sending an NLRS specifically includes that:

different base stations having a same synchronization level use a same resource for sending an NLRS;

or, the resource determined by the base station is the same as a resource that is usable by another base station having a same synchronization level for sending an NLRS;

or, in the mapping relationship between the synchronization level and a resource for sending an NLRS, one synchronization level corresponds to only one resource for sending an NLRS;

where the resource includes at least one of the following: a time domain resource, a frequency domain resource, and a code resource.

In the first possible implementation manner of the first aspect, in a third possible implementation manner, the resource includes a time domain resource and a frequency domain resource; and the mapping relationship between the synchronization level and a resource for sending an NLRS specifically includes that:

time domain resources in resources for sending an NLRS by different base stations having a same synchronization level are different;

or, frequency domain resources in resources for sending an NLRS by different base stations having a same synchronization level are different;

or, the time domain resource and/or frequency domain resource determined by the base station is unusable by another base station having a same synchronization level;

or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

Among possible implementation manners of the first aspect, or in the first possible implementation manner of the first aspect, or in the third possible implementation manner of the first aspect, in a fourth possible implementation manner, the sending, by the base station, the NLRS according to the determined resource specifically includes:

staying, by the base station when another base station having a same level sends an NLRS, silent on the determined resource;

and, sending, by the base station when the another base station having a same level stays silent, the NLRS on the determined resource.

In the first possible implementation manner of the first aspect, in a fifth possible implementation manner, the mapping relationship between the synchronization level and a resource for sending an NLRS specifically includes that:

time domain resources in resources for sending an NLRS by different base stations having different synchronization levels are different;

or, frequency domain resources in resources for sending an NLRS by different base stations having different synchronization levels are different;

or, the time domain resource and/or frequency domain resource determined by the base station is unusable by another base station having a different synchronization level.

In the fifth possible implementation manner of the first aspect, in a sixth possible implementation manner, the sending, by the base station, the NLRS according to the determined resource specifically includes:

staying, by the base station when another base station having a different level sends an NLRS, silent on the determined resource, and sending data on another resource than the determined resource;

and, sending, by the base station when the another base station having a different level stays silent, the NLRS on the determined resource.

In the first possible implementation manner of the first aspect, in a seventh possible implementation manner, the resource includes: a time domain resource; and the mapping relationship between the synchronization level and a resource for sending an NLRS specifically includes that:

in different base stations corresponding to N synchronization levels, at most N−1 different base stations having different synchronization levels use a same time domain resource for sending an NLRS, where N is a positive integer and N is greater than 1;

or, in different base stations corresponding to N synchronization levels, the time domain resource determined by the base station is the same as a time domain resource that is usable by at most N−2 base stations having different synchronization levels for sending an NLRS;

or, in the mapping relationship between the synchronization level and a time domain resource for sending an NLRS, for different base stations corresponding to N synchronization levels, at most N−1 different synchronization levels correspond to only one time domain resource for sending an NLRS.

In the seventh possible implementation manner of the first aspect, in an eighth possible implementation manner, the sending, by the base station, the NLRS according to the determined resource specifically includes:

staying, by the base station when multiple base stations in N−2 base stations that have a same time domain resource and different levels send an NLRS, silent on the determined resource, and sending data on another resource than the determined resource;

and, sending, by the base station when multiple base stations in the N−2 base stations that have a same time domain resource and different levels stay silent, the NLRS on the determined resource.

In the first possible implementation manner of the first aspect, in a ninth possible implementation manner, the mapping relationship between the synchronization level and a resource for sending an NLRS specifically includes that:

resources for sending an NLRS that correspond to at least two adjacent synchronization levels are different;

where the resource includes a time domain resource, a frequency domain resource, and a code resource.

In the ninth possible implementation manner of the first aspect, in a tenth possible implementation manner, that resources for sending an NLRS that correspond to at least two adjacent synchronization levels are different specifically includes that:

the resources for sending an NLRS that correspond to at least two adjacent synchronization levels are determined by different time domain information located in a same subframe, where a resource, for sending an NLRS, that corresponds to at least a first adjacent synchronization level is determined by using a first time domain of one subframe, a resource for sending an NLRS, corresponding to at least a second synchronization level adjacent to the first synchronization level is determined by using a second time domain of the subframe, and a time length between the first time domain and the second time domain is at least separated by a set base station uplink/downlink switching time length.

In the tenth possible implementation manner of the first aspect, in an eleventh possible implementation manner, that the resources for sending an NLRS that correspond to at least two adjacent synchronization levels are determined by different time domain information located in a same subframe specifically includes that:

the resources for sending an NLRS that correspond to at least two adjacent synchronization levels are determined by different orthogonal frequency-division multiplexing OFDM symbols located in a same subframe.

In the ninth possible implementation manner of the first aspect, in a twelfth possible implementation manner, that the resources for sending an NLRS that correspond to at least two adjacent synchronization levels are different specifically includes that:

the resources for sending an NLRS that correspond to at least two adjacent synchronization levels are determined by orthogonal frequency-division multiplexing OFDM symbols located in different subframes.

In the second possible implementation manner of the first aspect, or in the fifth possible implementation manner of the first aspect, or in the ninth possible implementation manner of the first aspect, in a thirteenth possible implementation manner, the code resource includes an NLRS sequence; and the sequence for sending an NLRS is obtained in at least one manner in the following:

generated from a pseudorandom sequence;

or, generated from a Zadoff-Chu sequence;

or, generated from a machine generated sequence.

In the thirteenth possible implementation manner of the first aspect, in a fourteenth possible implementation manner, that the sequence for sending an NLRS is generated from a Zadoff-Chu sequence specifically includes:

mapping a Zadoff-Chu sequence whose sequence length is a set numeric value to a specified frequency domain bandwidth or time domain symbol; and when the set numeric value is equal to a quantity of subcarriers corresponding to the specified frequency domain bandwidth or time domain symbol, mapping the Zadoff-Chu sequence whose sequence length is the set numeric value to the specified frequency domain bandwidth or time domain symbol;

or, when the set numeric value is less than a quantity of subcarriers corresponding to the specified frequency domain bandwidth or time domain symbol, periodically expanding the Zadoff-Chu sequence whose sequence length is the set numeric value on a frequency domain or a time domain, so that a length of the expanded sequence is equal to that of the specified frequency domain bandwidth or time domain symbol, and mapping the expanded sequence to the specified frequency domain width or time domain symbol;

or, when the set numeric value is greater than a quantity of subcarriers corresponding to the specified frequency domain bandwidth or time domain symbol, intercepting a part of the Zadoff-Chu sequence whose sequence length is the set numeric value, so that an intercepted length is equal to the quantity of subcarriers corresponding to the specified frequency domain bandwidth or time domain symbol, and mapping the intercepted sequence to the specified frequency domain bandwidth or time domain symbol.

In the fourth possible implementation manner of the first aspect, in a fifteenth possible implementation manner, the NLRS for sending is obtained according to a synchronization level.

In the fifteenth possible implementation manner of the first aspect, in a sixteenth possible implementation manner, that the NLRS for sending is obtained according to a synchronization level specifically includes:

obtaining an initialized sequence for sending the NLRS, corresponding to the synchronization level according to a synchronization level and a set pseudorandom initialized sequence;

generating a pseudorandom sequence for the NLRS from the obtained initialized sequence for the NLRS by using the set pseudorandom generation sequence; and obtaining, according to the generated pseudorandom sequence for the NLRS, a sequence for sending the NLRS, corresponding to the synchronization level.

In the sixteenth possible implementation manner of the first aspect, in a seventeenth possible implementation manner, the set pseudorandom initialized sequence is:

a pseudorandom initialized sequence of each orthogonal frequency-division multiplexing OFDM symbol of an initialized sequence of a common reference signal CRS or an initialized sequence of a channel state information-reference signal CSI-RS;

or, a pseudorandom initialized sequence of an initialized sequence of a dedicated reference signal (DRS) or an initialized sequence of a demodulation reference signal (DMRS).

Among possible implementation manners of the first aspect, in an eighteenth possible implementation manner, after the determining a resource for sending a network listening reference signal NLRS, the method further includes:

sending, by the base station, the determined resource for sending an NLRS to user equipment by using set signaling or by using a specified signaling format; and instructing the user equipment to determine, according to the received resource, a zero power signal and determine resource position information for data rate matching and/or data puncturing.

Among possible implementation manners of the first aspect, in a ninteenth possible implementation manner, after the sending, by the base station, the NLRS according to the determined resource, the method further includes:

sending, by the base station, the determined resource for sending an NLRS to user equipment by using set signaling; and instructing the user equipment to receive an NLRS signal according to the received resource of the NLRS and perform clock synchronization with the base station by using the received NLRS signal.

According to a second aspect of the present invention, a method for synchronization between base stations is provided, including:

listening, by a first base station, to a network listening reference signal NLRS sent by at least one second base station;

determining a synchronization level of the second base station according to a resource that is obtained by listening and used for sending the NLRS by the second base station; and when the determined synchronization level of the second base station is lower than a synchronization level of the first base station, periodically tracking the NLRS sent by the second base station to maintain synchronization.

Among possible implementation manners of the second aspect, in a first possible implementation manner, after the determining a synchronization level of the second base station, and before the determined synchronization level of the second base station is lower than a synchronization level of the first base station, the method further includes:

performing comparison to find whether the found synchronization level of the second base station is the same as the synchronization level of the first base station; and when the found synchronization level of the second base station is the same as the synchronization level of the first base station, determining that the second base station is a base station whose synchronization level is the same as that of the first base station; or when the found synchronization level of the second base station is different from the synchronization level of the first base station, determining that the second base station is a base station whose synchronization level is different from that of the first base station.

In the first possible implementation manner of the second aspect, in a second possible implementation manner, after the determining that the second base station is a base station whose synchronization level is the same as that of the first base station, the method further includes:

when the second base station sends the NLRS on the resource that is obtained by listening and used for sending the NLRS by the second base station, staying, by the first base station, silent on the resource that is obtained by listening and used for sending the NLRS by the second base station;

and, when the second base station stays silent on the resource that is obtained by listening and used for sending the NLRS by the second base station, sending, by the first base station, the NLRS on the resource that is obtained by listening and used for sending the NLRS by the second base station.

In the first possible implementation manner of the second aspect, in a third possible implementation manner, after the determining that the second base station is a base station whose synchronization level is different from that of the first base station, the method further includes:

when the second base station sends the NLRS on the resource that is obtained by listening and used for sending the NLRS by the second base station, staying, by the first base station, silent on the resource that is obtained by listening and used for sending the NLRS by the second base station, and sending data on another resource except the resource for the NLRS;

and, when the second base station stays silent on the resource that is obtained by listening and used for sending the NLRS by the second base station, sending, by the first base station, the NLRS on the resource that is obtained by listening and used for sending the NLRS by the second base station.

Among possible implementation manners of the second aspect, or in the first possible implementation manner of the second aspect, or in the second possible implementation manner of the second aspect, or in the third possible implementation manner of the second aspect, in a fourth possible implementation manner, the first base station is a multicarrier base station; and the synchronization level of the first base station is determined in a following manner, specifically including:

determining different NLRSs for separate synchronization of multiple carriers in the first base station;

obtaining, according to an NLRS for synchronization of one carrier, a synchronization level of the carrier; and comparing synchronization levels corresponding to the multiple carriers of the first base station with the synchronization level of the first base station, and determining a lowest synchronization level as the synchronization level of the first base station.

Among possible implementation manners of the second aspect, or in the first possible implementation manner of the second aspect, or in the second possible implementation manner of the second aspect, or in the third possible implementation manner of the second aspect, in a fifth possible implementation manner, the first base station is a base station in an initialized state; and the synchronization level of the first base station is determined in a following manner, specifically including:

determining a set maximum value of synchronization level in a communications network system; and using the determined maximum value of synchronization level as the synchronization level of the first base station.

Among possible implementation manners of the second aspect, in a sixth possible implementation manner, the determining a synchronization level of the second base station according to a resource that is obtained by listening and used for sending the NLRS by the second base station specifically includes:

searching, according to a pre-established mapping relationship between a synchronization level and a resource for sending an NLRS, for the synchronization level of the second base station, corresponding to the resource that is obtained by listening and used for sending the NLRS by the second base station.

In the first possible implementation manner of the second aspect, in a seventh possible implementation manner, that the determined synchronization level of the second base station is lower than a synchronization level of the first base station specifically includes:

determining whether a difference between the synchronization level of the second base station and the synchronization level of the first base station is not greater than a set threshold; where when the difference between the synchronization level of the second base station and the synchronization level of the first base station is not greater than the set threshold, the determined synchronization level of the second base station is lower than the synchronization level of the first base station.

In the seventh possible implementation manner of the second aspect, in an eighth possible implementation manner, before the periodically tracking the NLRS sent by the second base station to maintain synchronization, the method further includes:

selecting, from second base stations whose determined synchronization levels are lower than the synchronization level of the first base station, a second base station having a lowest synchronization level as a synchronization source base station for synchronization tracking of the first base station.

In the first possible implementation manner of the second aspect, in a ninth possible implementation manner, after the listening, by a first base station, to a network listening reference signal NLRS sent by at least one second base station, the method further includes:

configuring, by the first base station, the network listening reference signal NLRS that is sent by the at least one second base station and is obtained by listening in a multimedia broadcast multicast service single frequency network MBSFN subframe or a guard interval GP.

According to a third aspect of the present invention, a device for sending a synchronization signal is provided, including:

a determining module, configured to determine a resource for sending a network listening reference signal NLRS according to a synchronization level of the device, where the NLRS is used for clock synchronization between base stations; and a sending module, configured to send the NLRS according to the resource determined by the determining module.

Among possible implementation manners of the third aspect, in a first possible implementation manner, the determining module, specifically configured to determine the resource for sending the NLRS according to the synchronization level of the device and a mapping relationship between the synchronization level and a resource for sending an NLRS.

In the first possible implementation manner of the third aspect, in a second possible implementation manner, the mapping relationship between the synchronization level and a resource for sending an NLRS specifically includes that:

different base stations having a same synchronization level use a same resource for sending an NLRS;

or, the resource determined by the base station is the same as a resource that is usable by another base station having a same synchronization level for sending an NLRS;

or, in the mapping relationship between the synchronization level and a resource for sending an NLRS, one synchronization level corresponds to only one resource for sending an NLRS;

where the resource includes at least one of the following: a time domain resource, a frequency domain resource, and a code resource.

In the first possible implementation manner of the third aspect, in a third possible implementation manner, the resource includes a time domain resource and a frequency domain resource; and the mapping relationship between the synchronization level and a resource for sending an NLRS specifically includes that:

time domain resources in resources for sending an NLRS by different base stations having a same synchronization level are different;

or, frequency domain resources in resources for sending an NLRS by different base stations having a same synchronization level are different;

or, the time domain resource and/or frequency domain resource determined by the base station is unusable by another base station having a same synchronization level;

or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

Among possible implementation manners of the third aspect, or in the first possible implementation manner of the third aspect, or in the third possible implementation manner of the third aspect, in a fourth possible implementation manner, the sending module is specifically configured to stay silent on the determined resource when another base station having a same level sends an NLRS;

and, when the another base station having a same level stays silent, send the NLRS on the determined resource.

In the first possible implementation manner of the third aspect, in a fifth possible implementation manner, the mapping relationship between the synchronization level and a resource for sending an NLRS specifically includes that:

time domain resources in resources for sending an NLRS by different base stations having different synchronization levels are different;

or, frequency domain resources in resources for sending an NLRS by different base stations having different synchronization levels are different;

or, the time domain resource and/or frequency domain resource determined by the base station is unusable by another base station having a different synchronization level.

In the fifth possible implementation manner of the third aspect, in a sixth possible implementation manner, the sending module is specifically configured to: when another base station having a different level sends an NLRS, stay silent on the determined resource, and send data on another resource than the determined resource;

and, when the another base station having a different level stays silent, send the NLRS on the determined resource.

In the first possible implementation manner of the third aspect, in a seventh possible implementation manner, the resource includes: a time domain resource; and the mapping relationship between the synchronization level and a resource for sending an NLRS specifically includes that:

in different base stations corresponding to N synchronization levels, at most N−1 different base stations having different synchronization levels use a same time domain resource for sending an NLRS, where N is a positive integer and N is greater than 1;

or, in different base stations corresponding to N synchronization levels, the time domain resource determined by the base station is the same as a time domain resource that is usable by at most N−2 base stations having different synchronization levels for sending an NLRS;

or, in the mapping relationship between the synchronization level and a time domain resource for sending an NLRS, for different base stations corresponding to N synchronization levels, at most N−1 different synchronization levels correspond to only one time domain resource for sending an NLRS.

In the seventh possible implementation manner of the third aspect, in an eighth possible implementation manner, the sending module is specifically configured to: when multiple base stations in N−2 base stations that have a same time domain resource and different levels send an NLRS, stay silent on the determined resource, and send data on another resource than the determined resource;

and, when multiple base stations in the N−2 base stations that have a same time domain resource and different levels stay silent, send the NLRS on the determined resource.

In the first possible implementation manner of the third aspect, in a ninth possible implementation manner, the mapping relationship between the synchronization level and a resource for sending an NLRS specifically includes that:

resources for sending an NLRS that correspond to at least two adjacent synchronization levels are different;

where the resource includes a time domain resource, a frequency domain resource, and a code resource.

In the ninth possible implementation manner of the third aspect, in a tenth possible implementation manner, that the resources for sending an NLRS that correspond to at least two adjacent synchronization levels are different specifically includes that:

the resources for sending an NLRS that correspond to at least two adjacent synchronization levels are determined by different time domain information located in a same subframe, where a resource, for sending an NLRS, that corresponds to at least a first adjacent synchronization level is determined by using a first time domain of one subframe, a resource for sending an NLRS, corresponding to at least a second synchronization level adjacent to the first synchronization level is determined by using a second time domain of the subframe, and a time length between the first time domain and the second time domain is at least separated by a set base station uplink/downlink switching time length.

In the tenth possible implementation manner of the third aspect, in an eleventh possible implementation manner, that the resources for sending an NLRS that correspond to at least two adjacent synchronization levels are determined by different time domain information located in a same subframe specifically includes that:

the resources for sending an NLRS that correspond to at least two adjacent synchronization levels are determined by different orthogonal frequency-division multiplexing OFDM symbols located in a same subframe.

In the ninth possible implementation manner of the third aspect, in a twelfth possible implementation manner, that the resources for sending an NLRS that correspond to at least two adjacent synchronization levels are different specifically includes that:

the resources for sending an NLRS that correspond to at least two adjacent synchronization levels are determined by orthogonal frequency-division multiplexing OFDM symbols located in different subframes.

In the second possible implementation manner of the third aspect, or in the fifth possible implementation manner of the third aspect, or in the ninth possible implementation manner of the third aspect, in a thirteenth possible implementation manner, the code resource includes an NLRS sequence; and the sequence for sending an NLRS is obtained in at least one manner in the following:
generated from a pseudorandom sequence;
or, generated from a Zadoff-Chu sequence;
or, generated from a machine generated sequence.

In the thirteenth possible implementation manner of the third aspect, in a fourteenth possible implementation manner, that the sequence for sending an NLRS is generated from a Zadoff-Chu sequence specifically includes:

mapping a Zadoff-Chu sequence whose sequence length is a set numeric value to a specified frequency domain bandwidth or time domain symbol; and when the set numeric value is equal to a quantity of subcarriers corresponding to the specified frequency domain bandwidth or time domain symbol, mapping the Zadoff-Chu sequence whose sequence length is the set numeric value to the specified frequency domain bandwidth or time domain symbol;

or, when the set numeric value is less than a quantity of subcarriers corresponding to the specified frequency domain bandwidth or time domain symbol, periodically expanding the Zadoff-Chu sequence whose sequence length is the set numeric value on a frequency domain or a time domain, so that a length of the expanded sequence is equal to that of the specified frequency domain bandwidth or time domain symbol, and mapping the expanded sequence to the specified frequency domain width or time domain symbol;

or, when the set numeric value is greater than a quantity of subcarriers corresponding to the specified frequency domain bandwidth or time domain symbol, intercepting a part of the Zadoff-Chu sequence whose sequence length is the set numeric value, so that an intercepted length is equal to the quantity of subcarriers corresponding to the specified frequency domain bandwidth or time domain symbol, and mapping the intercepted sequence to the specified frequency domain bandwidth or time domain symbol.

In the fourth possible implementation manner of the third aspect, in a fifteenth possible implementation manner, the NLRS for sending is obtained according to a synchronization level.

In the fifteenth possible implementation manner of the third aspect, in a sixteenth possible implementation manner, that the NLRS for sending is obtained according to a synchronization level specifically includes:

obtaining an initialized sequence for sending the NLRS, corresponding to the synchronization level according to a synchronization level and a set pseudorandom initialized sequence;

generating a pseudorandom sequence for the NLRS from the obtained initialized sequence for the NLRS by using the set pseudorandom generation sequence; and obtaining, according to the generated pseudorandom sequence for the NLRS, a sequence for sending the NLRS, corresponding to the synchronization level.

In the sixteenth possible implementation manner of the third aspect, in a seventeenth possible implementation manner, the set pseudorandom initialized sequence is:

a pseudorandom initialized sequence of each orthogonal frequency-division multiplexing OFDM symbol of an initialized sequence of a common reference signal CRS or an initialized sequence of a channel state information-reference signal CSI-RS;

or, a pseudorandom initialized sequence of an initialized sequence of a dedicated signal DRS or an initialized sequence of a demodulation signal DMRS.

Among possible implementation manners of the third aspect, in an eighteenth possible implementation manner, the device further includes:

a first resource sending module, configured to: after the determining module determines the resource for sending a network listening reference signal NLRS, send the determined resource for sending an NLRS to user equipment by using set signaling or by using a specified signaling format, and instruct the user equipment to determine, according to the received resource, a zero power signal and determine resource position information for data rate matching and/or data puncturing.

Among possible implementation manners of the third aspect, in a ninteenth possible implementation manner, the device further includes:

a second resource sending module, configured to: after the NLRS is sent according to the resource determined by the determining module, send the determined resource for sending an NLRS to user equipment by using set signaling, and instruct the user equipment to receive an NLRS signal according to the received resource of the NLRS and perform clock synchronization with the base station by using the received NLRS signal.

According to a fourth aspect of the present invention, a device for synchronization between base stations is provided, including:

a listening module, configured to listen to a network listening reference signal NLRS sent by at least one second base station;

a synchronization level determining module, configured to determine a synchronization level of the second base station according to a resource that is obtained by listening by the listening module and used for sending the NLRS by the second base station; and a synchronization module, configured to: when the synchronization level of the second base station determined by the synchronization level determining module is lower than a synchronization level of a current base station, periodically track the NLRS sent by the second base station to maintain synchronization.

Among possible implementation manners of the fourth aspect, in a first possible implementation manner, the device further includes:

a comparison module, configured to: after the synchronization level determining module determines the synchronization level of the second base station, and before it is determined that the synchronization level of the second base station is lower than the synchronization level of the current base station, perform comparison to find whether the found synchronization level of the second base station is the same as the synchronization level of the current base station; and when the found synchronization level of the second base station is the same as the synchronization level of the current base station, determine that the second base station is a base station whose synchronization level is the same as that of the current base station; or when the found synchronization level of the second base station is different from the synchronization level of the current base station, determine that the second base station is a base station whose synchronization level is different from that of the current base station.

In the first possible implementation manner of the fourth aspect, in a second possible implementation manner, the device further includes:

a synchronization signal sending module, configured to: after the comparison module determines that the second base station is a base station whose synchronization level is the same as that of the current base station, when the second base station sends the NLRS on the resource that is obtained by listening and used for sending the NLRS by the second base station, stay silent on the resource that is obtained by listening and used for sending the NLRS by the second base station;

and, when the second base station stays silent on the resource that is obtained by listening and used for sending the NLRS by the second base station, send the NLRS on the resource that is obtained by listening and used for sending the NLRS by the second base station.

In the first possible implementation manner of the fourth aspect, in a third possible implementation manner, the device further includes:

a synchronization signal sending module, configured to: after it is determined that the second base station is a base station whose synchronization level is different from that of the first base station, when the second base station sends the NLRS on the resource that is obtained by listening and used for sending the NLRS by the second base station, stay silent on the resource that is obtained by listening and used for sending the NLRS by the second base station, and send data on another resource except the resource for the NLRS; and, when the second base station stays silent on the resource that is obtained by listening and used for sending the NLRS by the second base station, send the NLRS on the resource that is obtained by listening and used for sending the NLRS by the second base station.

Among possible implementation manners of the fourth aspect, or in the first possible implementation manner of the fourth aspect, or in the second possible implementation manner of the fourth aspect, or in the third possible implementation manner of the fourth aspect, in a fourth possible implementation manner, the synchronization base station is a multicarrier base station; and a synchronization level of the synchronization base station is determined in a following manner, specifically including:

determining different NLRSs for separate synchronization of multiple carriers in the synchronization base station;

obtaining, according to an NLRS for synchronization of one carrier, a synchronization level of the carrier; and comparing synchronization levels corresponding to the multiple carriers of the synchronization base station with the synchronization level of the synchronization base station, and determining a lowest synchronization level as the synchronization level of the synchronization base station.

Among possible implementation manners of the fourth aspect, or in the first possible implementation manner of the fourth aspect, or in the second possible implementation manner of the fourth aspect, or in the third possible implementation manner of the fourth aspect, in a fifth possible implementation manner, the synchronization base station is a base station in an initialized state; and a synchronization level of the synchronization base station is determined in a following manner, specifically including:

determining a set maximum value of synchronization level in a communications network system; and using the determined maximum value of synchronization level as the synchronization level of the synchronization base station.

Among possible implementation manners of the fourth aspect, in a sixth possible implementation manner, the synchronization level determining module is specifically configured to search, according to a pre-established mapping relationship between a synchronization level and a resource for sending an NLRS, for the synchronization level of the second base station, corresponding to the resource that is obtained by listening by the listening module and used for sending the NLRS by the second base station.

In the first possible implementation manner of the fourth aspect, in a seventh possible implementation manner, the synchronization module is specifically configured to determine whether a difference between the synchronization level of the second base station determined by the synchronization level determining module and the synchronization level of the current base station is not greater than a set threshold; where when the difference between the synchronization level of the second base station and the synchronization level of the current base station is not greater than the set threshold, it is determined that the synchronization level of the second base station is lower than the synchronization level of the current base station.

In the seventh possible implementation manner of the fourth aspect, in an eighth possible implementation manner, the device further includes:

a synchronization source base station determining module, configured to: before the NLRS sent by the second base station to maintain synchronization is periodically tracked, select, from second base stations whose determined synchronization levels are lower than the synchronization level of the current base station, a second base station having a lowest synchronization level as a synchronization source base station for synchronization tracking of the current base station.

In the first possible implementation manner of the fourth aspect, in a ninth possible implementation manner, the device further includes:

a configuration module, configured to: after the listening module obtains, through listening, a network listening reference signal NLRS sent by at least one second base station, configure the network listening reference signal NLRS that is sent by the at least one second base station and is obtained by listening in a multimedia broadcast multicast service single frequency network MBSFN subframe or a guard interval GP.

According to a fifth aspect of the present invention, a synchronization source base station is provided, including:

a processor, configured to determine a resource for sending a network listening reference signal NLRS according to a synchronization level of the device, where the NLRS is used for clock synchronization between base stations; and a signal transceiver, configured to send the NLRS according to the determined resource.

Among possible implementation manners of the fifth aspect, in a first possible implementation manner, the processor is specifically configured to determine the resource for sending the NLRS according to the synchronization level of the device and a mapping relationship between the synchronization level and a resource for sending an NLRS.

In the first possible implementation manner of the fifth aspect, in a second possible implementation manner, the mapping relationship between the synchronization level and a resource for sending an NLRS specifically includes that:

different base stations having a same synchronization level use a same resource for sending an NLRS;

or, the resource determined by the base station is the same as a resource that is usable by another base station having a same synchronization level for sending an NLRS;

or, in the mapping relationship between the synchronization level and a resource for sending an NLRS, one synchronization level corresponds to only one resource for sending an NLRS;

where the resource includes at least one of the following: a time domain resource, a frequency domain resource, and a code resource.

In the first possible implementation manner of the fifth aspect, in a third possible implementation manner, the resource includes a time domain resource and a frequency domain resource; and the mapping relationship between the synchronization level and a resource for sending an NLRS specifically includes that:

time domain resources in resources for sending an NLRS by different base stations having a same synchronization level are different;

or, frequency domain resources in resources for sending an NLRS by different base stations having a same synchronization level are different;

or, the time domain resource and/or frequency domain resource determined by the base station is unusable by another base station having a same synchronization level;

or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

Among possible implementation manners of the fifth aspect, or in the first possible implementation manner of the fifth aspect, or in the third possible implementation manner of the fifth aspect, in a fourth possible implementation manner, the signal transceiver is specifically configured to stay silent on the determined resource when another base station having a same level sends an NLRS;

and, when the another base station having a same level stays silent, send the NLRS on the determined resource.

In the first possible implementation manner of the fifth aspect, in a fifth possible implementation manner, the mapping relationship between the synchronization level and a resource for sending an NLRS specifically includes that:

time domain resources in resources for sending an NLRS by different base stations having different synchronization levels are different;

or, frequency domain resources in resources for sending an NLRS by different base stations having different synchronization levels are different;

or, the time domain resource and/or frequency domain resource determined by the base station is unusable by another base station having a different synchronization level.

In the fifth possible implementation manner of the fifth aspect, in a sixth possible implementation manner, the signal transceiver is specifically configured to: when another base station having a different level sends an NLRS, stay silent on the determined resource, and send data on another resource than the determined resource;

and, when the another base station having a different level stays silent, send the NLRS on the determined resource.

In the first possible implementation manner of the fifth aspect, in a seventh possible implementation manner, the resource includes: a time domain resource; and the mapping relationship between the synchronization level and a resource for sending an NLRS specifically includes that:

in different base stations corresponding to N synchronization levels, at most N−1 different base stations having different synchronization levels use a same time domain resource for sending an NLRS, where N is a positive integer and N is greater than 1;

or, in different base stations corresponding to N synchronization levels, the time domain resource determined by the base station is the same as a time domain resource that is usable by at most N−2 base stations having different synchronization levels for sending an NLRS;

or, in the mapping relationship between the synchronization level and a time domain resource for sending an NLRS, for different base stations corresponding to N synchronization levels, at most N−1 different synchronization levels correspond to only one time domain resource for sending an NLRS.

In the seventh possible implementation manner of the fifth aspect, in an eighth possible implementation manner, the signal transceiver is specifically configured to: when multiple base stations in N−2 base stations that have a same time domain resource and different levels send an NLRS, stay silent on the determined resource, and send data on another resource than the determined resource;

and, when multiple base stations in the N−2 base stations that have a same time domain resource and different levels stay silent, send the NLRS on the determined resource.

In the first possible implementation manner of the fifth aspect, in a ninth possible implementation manner, the mapping relationship between the synchronization level and a resource for sending an NLRS specifically includes that:

resources for sending an NLRS that correspond to at least two adjacent synchronization levels are different;

where the resource includes a time domain resource, a frequency domain resource, and a code resource.

In the ninth possible implementation manner of the fifth aspect, in a tenth possible implementation manner, that the resources for sending an NLRS that correspond to at least two adjacent synchronization levels are different specifically includes that:

the resources for sending an NLRS that correspond to at least two adjacent synchronization levels are determined by different time domain information located in a same subframe, where a resource, for sending an NLRS, that corresponds to at least a first adjacent synchronization level is determined by using a first time domain of one subframe, a resource for sending an NLRS, corresponding to at least a second synchronization level adjacent to the first synchronization level is determined by using a second time domain of the subframe, and a time length between the first time domain and the second time domain is at least separated by a set base station uplink/downlink switching time length.

In the tenth possible implementation manner of the fifth aspect, in an eleventh possible implementation manner, that the resources for sending an NLRS that correspond to at least two adjacent synchronization levels are determined by different time domain information located in a same subframe specifically includes that:

the resources for sending an NLRS that correspond to at least two adjacent synchronization levels are determined by different orthogonal frequency-division multiplexing OFDM symbols located in a same subframe.

In the ninth possible implementation manner of the fifth aspect, in a twelfth possible implementation manner, that the resources for sending an NLRS that correspond to at least two adjacent synchronization levels are different specifically includes that:

the resources for sending an NLRS that correspond to at least two adjacent synchronization levels are determined by orthogonal frequency-division multiplexing OFDM symbols located in different subframes.

In the second possible implementation manner of the fifth aspect, or in the fifth possible implementation manner of the fifth aspect, or in the ninth possible implementation manner of the fifth aspect, in a thirteenth possible implementation manner, the code resource includes an NLRS sequence; and the sequence for sending an NLRS is obtained in at least one manner in the following:

generated from a pseudorandom sequence;

or, generated from a Zadoff-Chu sequence;

or, generated from a machine generated sequence.

In the thirteenth possible implementation manner of the fifth aspect, in a fourteenth possible implementation manner, that the sequence for sending an NLRS is generated from a Zadoff-Chu sequence specifically includes:

mapping a Zadoff-Chu sequence whose sequence length is a set numeric value to a specified frequency domain bandwidth or time domain symbol; and when the set numeric value is equal to a quantity of subcarriers corresponding to the specified frequency domain bandwidth or time domain symbol, mapping the Zadoff-Chu sequence whose sequence length is the set numeric value to the specified frequency domain bandwidth or time domain symbol;

or, when the set numeric value is less than a quantity of subcarriers corresponding to the specified frequency domain bandwidth or time domain symbol, periodically expanding the Zadoff-Chu sequence whose sequence length is the set numeric value on a frequency domain or a time domain, so that a length of the expanded sequence is equal to that of the specified frequency domain bandwidth or time domain symbol, and mapping the expanded sequence to the specified frequency domain width or time domain symbol;

or, when the set numeric value is greater than a quantity of subcarriers corresponding to the specified frequency domain bandwidth or time domain symbol, intercepting a part of the Zadoff-Chu sequence whose sequence length is the set numeric value, so that an intercepted length is equal to the quantity of subcarriers corresponding to the specified frequency domain bandwidth or time domain symbol, and mapping the intercepted sequence to the specified frequency domain bandwidth or time domain symbol.

In the fourth possible implementation manner of the fifth aspect, in a fifteenth possible implementation manner, the NLRS for sending is obtained according to a synchronization level.

In the fifteenth possible implementation manner of the fifth aspect, in a sixteenth possible implementation manner, that the NLRS for sending is obtained according to a synchronization level specifically includes:

obtaining an initialized sequence for sending the NLRS, corresponding to the synchronization level according to a synchronization level and a set pseudorandom initialized sequence;

generating a pseudorandom sequence for the NLRS from the obtained initialized sequence for the NLRS by using the set pseudorandom generation sequence; and obtaining, according to the generated pseudorandom sequence for the NLRS, a sequence for sending the NLRS, corresponding to the synchronization level.

In the sixteenth possible implementation manner of the fifth aspect, in a seventeenth possible implementation manner, the set pseudorandom initialized sequence is:

a pseudorandom initialized sequence of each orthogonal frequency-division multiplexing OFDM symbol of an initialized sequence of a common reference signal CRS or an initialized sequence of a channel state information-reference signal CSI-RS;

or, a pseudorandom initialized sequence of an initialized sequence of a dedicated signal DRS or an initialized sequence of a demodulation signal DMRS.

Among possible implementation manners of the fifth aspect, in an eighteenth possible implementation manner, the synchronization source base station further includes:

a first signal transmitter, configured to: after a resource for sending the network listening reference signal NLRS is determined, send the determined resource for sending an NLRS to user equipment by using set signaling or by using a specified signaling format, and instruct the user equipment to determine, according to the received resource, a zero power signal and determine resource position information for data rate matching and/or data puncturing.

Among possible implementation manners of the fifth aspect, in a ninteenth possible implementation manner, the synchronization source base station further includes:

a second signal transmitter, configured to: after the NLRS is sent according to the determined resource, send the determined resource for sending an NLRS to user equipment by using set signaling, and instruct the user equipment to receive an NLRS signal according to the received resource of the NLRS and perform clock synchronization with the base station by using the received NLRS signal.

According to a sixth aspect of the present invention, a synchronization base station is provided, including:

a signal receiver, configured to listen to a network listening reference signal NLRS sent by at least one second base station; and a controller, configured to determine a synchronization level of the second base station according to a resource that is obtained by listening and used for sending the NLRS by the second base station, and when a synchronization level of the second base station is lower than a synchronization level of a current base station that is determined by a synchronization level determining module, periodically track the NLRS sent by the second base station to maintain synchronization.

Among possible implementation manners of the sixth aspect, in a first possible implementation manner, the synchronization base station further includes:

a comparator, configured to: after the synchronization level of the second base station is determined, and before it is determined that the synchronization level of the second base station is lower than the synchronization level of the current base station, perform comparison to find whether the found synchronization level of the second base station is the same as the synchronization level of the current base station; and when the found synchronization level of the second base station is the same as the synchronization level of the current base station, determine that the second base station is a base station whose synchronization level is the same as that of the current base station; or when the found synchronization level of the second base station is different from the synchronization level of the current base station, determine that the second base station is a base station whose synchronization level is different from that of the current base station.

In the first possible implementation manner of the sixth aspect, in a second possible implementation manner, the synchronization base station further includes:

a signal transmitter, configured to: after it is determined that the second base station is a base station whose synchronization level is the same as that of the current base station, when the second base station sends the NLRS on the resource that is obtained by listening and used for sending the NLRS by the second base station, stay silent on the resource that is obtained by listening and used for sending the NLRS by the second base station;

and, when the second base station stays silent on the resource that is obtained by listening and used for sending the NLRS by the second base station, send the NLRS on the resource that is obtained by listening and used for sending the NLRS by the second base station.

In the first possible implementation manner of the sixth aspect, in a third possible implementation manner, the synchronization base station further includes:

a signal transmitter, configured to: after it is determined that the second base station is a base station whose synchronization level is different from that of the first base station, when the second base station sends the NLRS on the resource that is obtained by listening and used for sending the NLRS by the second base station, stay silent on the resource that is obtained by listening and used for sending the NLRS by the second base station, and send data on another resource except the resource for the NLRS; and, when the second base station stays silent on the resource that is obtained by listening and used for sending the NLRS by the second base station, send the NLRS on the resource that is obtained by listening and used for sending the NLRS by the second base station.

Among possible implementation manners of the sixth aspect, or in the first possible implementation manner of the sixth aspect, or in the second possible implementation manner of the sixth aspect, or in the third possible implementation manner of the sixth aspect, in a fourth possible implementation manner, the synchronization base station is a multicarrier base station; and a synchronization level of the synchronization base station is determined in a following manner, specifically including:

determining different NLRSs for separate synchronization of multiple carriers in the synchronization base station;

obtaining, according to an NLRS for synchronization of one carrier, a synchronization level of the carrier; and comparing synchronization levels corresponding to the multiple carriers of the synchronization base station with the synchronization level of the synchronization base station, and determining a lowest synchronization level as the synchronization level of the synchronization base station.

Among possible implementation manners of the sixth aspect, or in the first possible implementation manner of the sixth aspect, or in the second possible implementation manner of the sixth aspect, or in the third possible implementation manner of the sixth aspect, in a fifth possible implementation manner, the synchronization base station is a base station in an initialized state; and a synchronization level of the synchronization base station is determined in a following manner, specifically including:

determining a set maximum value of synchronization level in a communications network system; and using the determined maximum value of synchronization level as the synchronization level of the synchronization base station.

Among possible implementation manners of the sixth aspect, in a sixth possible implementation manner, the controller is specifically configured to search, according to a pre-established mapping relationship between a synchronization level and a resource for sending an NLRS, for a synchronization level of the second base station, corresponding to the resource that is obtained by listening by a listening module and used for sending the NLRS by the second base station.

In the first possible implementation manner of the sixth aspect, in a seventh possible implementation manner, the controller is specifically configured to determine whether a difference between the synchronization level of the second base station and the synchronization level of the current base station is not greater than a set threshold; and when the difference between the synchronization level of the second base station and the synchronization level of the current base station is not greater than the set threshold, determine that the synchronization level of the second base station is lower than the synchronization level of the current base station.

In the seventh possible implementation manner of the sixth aspect, in an eighth possible implementation manner, the device further includes:

a selector, configured to: before the NLRS sent by the second base station to maintain synchronization is periodically tracked, select, from second base stations whose determined synchronization levels are lower than the synchronization level of the current base station, a second base station having a lowest synchronization level as a synchronization source base station for synchronization tracking of the current base station.

In the first possible implementation manner of the sixth aspect, in a ninth possible implementation manner, the device further includes:

a memory, configured to: after a listening module obtains, through listening, a network listening reference signal NLRS sent by at least one second base station, configure the network listening reference signal NLRS that is sent by the at least one second base station and is obtained by listening in a multimedia broadcast multicast service single frequency network MBSFN subframe or a guard interval GP.

The present invention has beneficial effects as follows:

In the embodiments of the present invention, a synchronization source base station determines, according to a synchronization level of the synchronization source base station, a resource for sending a network listening reference signal for clock synchronization between base stations, and sends the NLRS according to the determined resource. In this way, one network listening reference signal for clock synchronization between base stations is configured on each synchronization source base station, and the NLRS is sent on a resource determined according to a synchronization level, so that a synchronization base station that acquires the network listening reference signal can determine the synchronization level of the synchronization source base station according to a resource for sending the NLRS, thereby avoiding occurrence of an error in determining a synchronization level of a base station caused by lack of CRS configuration when a CRS signal is used as a synchronization signal, improving accuracy that a synchronization base station determines a synchronization level of a synchronization source base station, and further enhancing synchronization accuracy that a synchronization base station tracks synchronization with a synchronization source base station.

DESCRIPTION OF EMBODIMENTS

To achieve the objective of the present invention, embodiments of the present invention provide a method and device for sending a synchronization signal and a method and device for synchronization between base stations. A synchronization source base station determines, according to a synchronization level of the synchronization source base station, a resource for sending a network listening reference signal for clock synchronization between base stations, and sends the NLRS according to the determined resource. In this way, one network listening reference signal for clock synchronization between base stations is configured on each synchronization source base station, and the network listening reference signal is sent on a resource determined according to a synchronization level of the synchronization source base station, so that a synchronization base station that acquires the network listening reference signal can determine the synchronization level of the synchronization source base station according to a resource for sending the NLRS, thereby avoiding occurrence of an error in determining a synchronization level of a base station caused by lack of CRS configuration when a CRS signal is used as a synchronization signal, improving accuracy that a synchronization base station determines a synchronization level of a synchronization source base station, and further enhancing synchronization accuracy that a synchronization base station tracks synchronization with a synchronization source base station.

It should be noted that the present invention may be applied to a wireless communications system, for example, a long term evolution (LTE) communications system and a long term evolution-advanced (LTE-A) communications system.

The present invention may further be applied to a scenario in which network control and timing (NCT) is disabled and/or a small cell is disabled, which is not specifically limited here.

The embodiments of the present invention are described in detail below with reference to the accompanying drawings of the specification.

Embodiment 1

Figure 1:
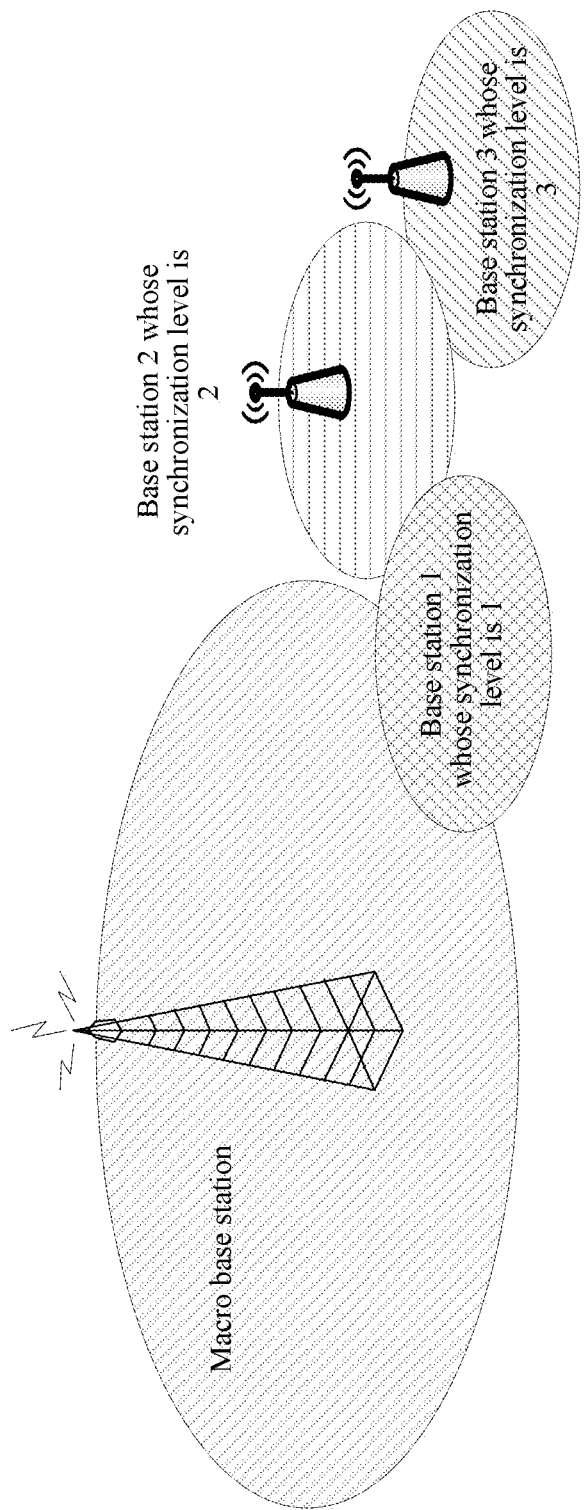
FIG. 1 is a schematic structural diagram of a multi-hop synchronization system.
Figure 2:
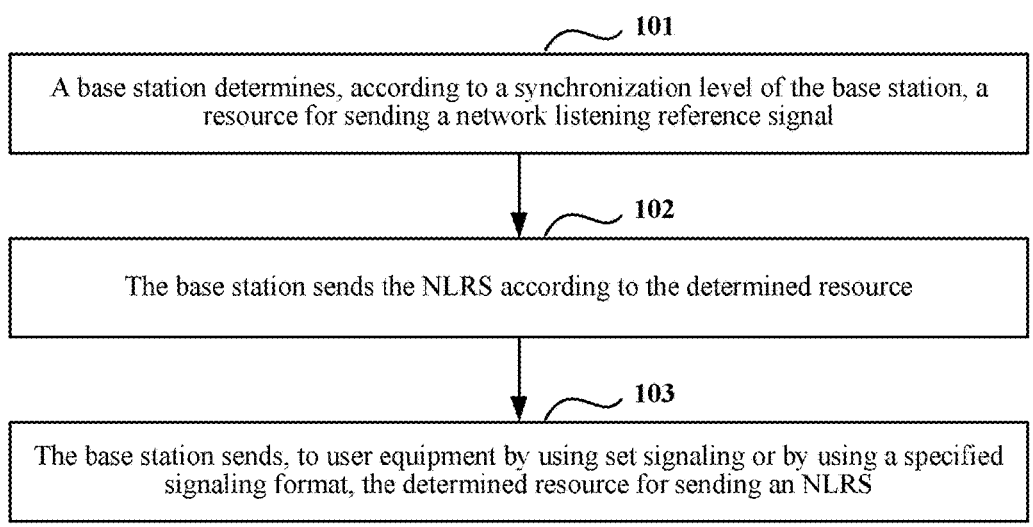
FIG. 2 is a schematic flowchart of a method for sending a synchronization signal according to Embodiment 1 of the present invention.

FIG. 2 is a schematic flowchart of a method for sending a synchronization signal according to Embodiment 1 of the present invention. The method includes:

Step 101: A base station determines, according to a synchronization level of the base station, a resource for sending a network listening reference signal (NLRS).

The NLRS is used for clock synchronization between base stations.

In step 101, the resource includes at least one of the following: a time domain resource, a frequency domain resource, and a code resource.

Figure 3:
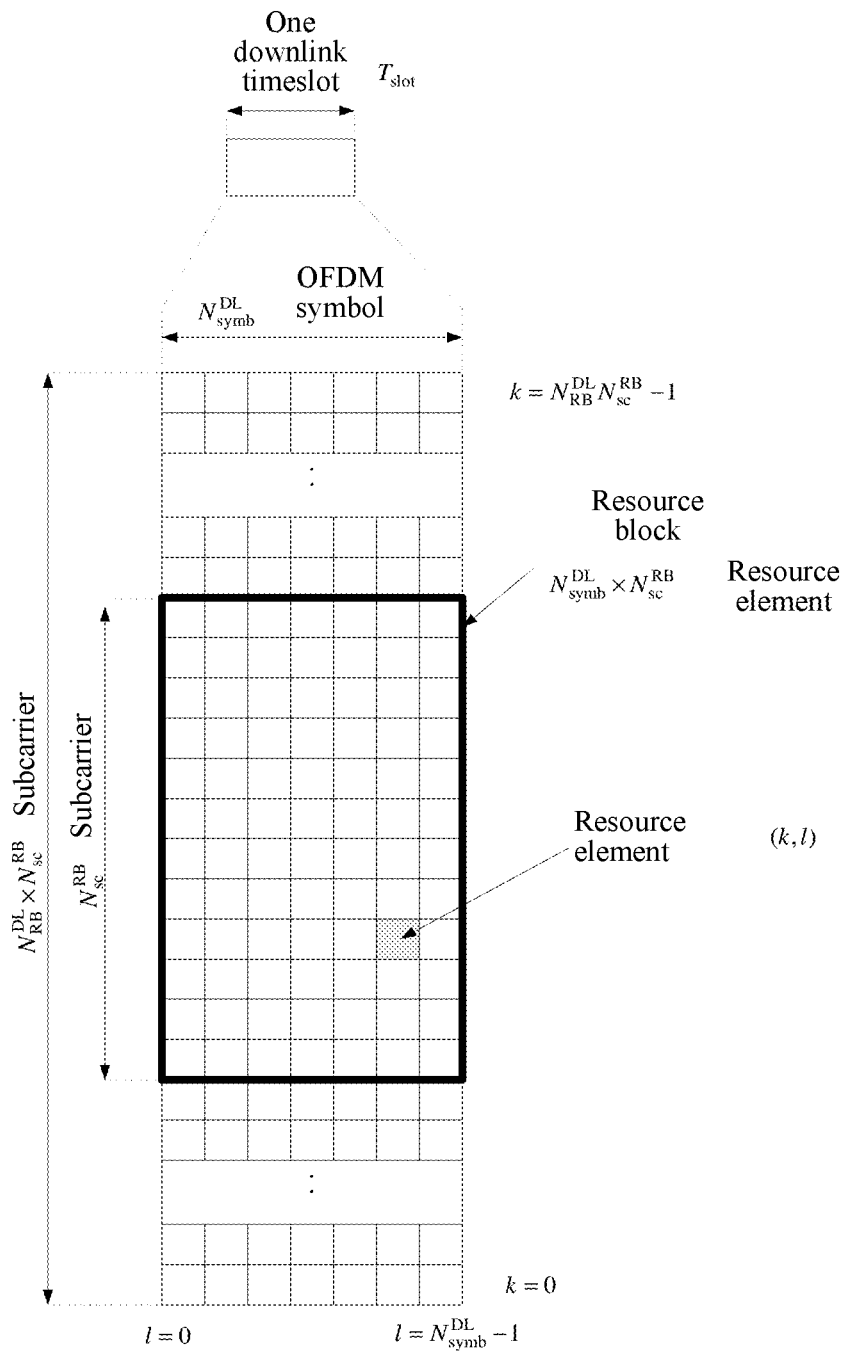
FIG. 3 is a schematic structural diagram of a downlink resource format in an LTE system.

For example, the resource includes a frequency domain resource, and the frequency domain resource may be an integer number of subcarriers, or may also be an integer number of resource elements (RE), or may be an integer number of resource blocks (RB). FIG. 3 is a schematic structural diagram of a downlink resource format in an LTE system.

When determining the resource for sending the NLRS, the base station may obtain the resource by making a search according to the synchronization level of the base station and a mapping relationship between the synchronization level and a resource for sending an NLRS.

The mapping relationship between the synchronization level and a resource for sending an NLRS may be established in the following manners:

Manner 1: A manner of signaling negotiation between different base stations.

Base stations negotiate, by means of signaling notification, on resources for sending NLRSs corresponding to various synchronization levels.

For example, different base stations may negotiate by means of signaling notification to determine a resource for sending an NLRS, corresponding to a synchronization level.

Different base stations having a same synchronization level may negotiate, by means of signaling notification, on a resource for sending an NLRS.

For example, different base stations having a same synchronization level may negotiation by means of signaling notification to determine a same resource for sending an NLRS.

Different base stations having different synchronization levels negotiate, by means of signaling notification, on a resource for sending an NLRS.

For example, different base stations having different synchronization levels negotiate by means of signaling notification to determine different resources for sending an NLRS.

Manner 2: A manner of predefining by a network side.

A network side pre-establishes a mapping relationship between a synchronization level of a base station and a resource for sending an NLRS, and sends the pre-established mapping relationship to the base station. When receiving the mapping relationship, the base station stores the mapping relationship locally for search during subsequent use.

For example, a mapping relationship, between a synchronization level of a base station and a resource for sending an NLRS, established by a network side is stored in a network side device in a form of a list.

Manner 3: A manner of designating by a control device on a network side.

A third-party control device on a network side specifies, for different base stations inside a management range, one resource for sending an NLRS, and establishes a mapping relationship between synchronization levels of the base stations and the resource for sending an NLRS.

Regardless whether a manner of negotiation between different base stations, or a manner of predefining by a network side, or a manner of designating by a control device on a network side is used, when a mapping relationship between a synchronization level and a resource for sending an NLRS is established, a rule in the following is followed:

Rule 1:

For different base stations having a same synchronization level, an established mapping relationship between a synchronization level and a resource for sending an NLRS meets that: different base stations having a same synchronization level use a same resource for sending an NLRS;

or, the resource determined by the base station is the same as a resource that is usable by another base station having a same synchronization level for sending an NLRS;

or, in the mapping relationship between the synchronization level and a resource for sending an NLRS, one synchronization level corresponds to only one resource for sending an NLRS.

That is, for multiple base stations of each synchronization level, there is only one resource for sending an NLRS.

The resource includes at least one of the following: a time domain resource, a frequency domain resource, and a code resource.

Case 1: For different base stations having a same synchronization level, when an NLRS is sent, resources for carrying the NLRS are the same, that is, time domain resources are the same, frequency domain resources are the same, and code resources are the same.

For example, the code resource includes an NLRS sequence. In such a case of determining that different base stations having a same synchronization level use a same resource for sending an NLRS, the different base stations having a same synchronization level send the same sequence for an NLRS on the determined same time domain resources and same frequency domain resources, so as to avoid interference from occurring between different base stations having a same synchronization level when the different base stations send the NLRS, thereby further avoiding a case that an error occurs in acquired synchronization clock information caused by interference when base stations perform network listening, so that accuracy of clock synchronization between base stations can be effectively improved.

Moreover, information of the sequence for sending an NLRS is obtained in at least one manner in the following: generated from a pseudorandom sequence;

or, generated from a Zadoff-Chu sequence;

or, generated from a machine generated sequence.

That the information of the sequence for sending an NLRS is generated from a Zadoff-Chu sequence, specifically includes:

mapping a Zadoff-Chu sequence whose sequence length is a set numeric value to a specified frequency domain bandwidth or time domain symbol; and when the set numeric value is equal to a quantity of subcarriers corresponding to the specified frequency domain bandwidth or time domain symbol, mapping the Zadoff-Chu sequence whose sequence length is the set numeric value to the specified frequency domain bandwidth or time domain symbol;

or, when the set numeric value is less than a quantity of subcarriers corresponding to the specified frequency domain bandwidth or time domain symbol, periodically expanding the Zadoff-Chu sequence whose sequence length is the set numeric value on a frequency domain or a time domain, so that a length of the expanded sequence is equal to the quantity of subcarriers corresponding to the specified frequency domain bandwidth or time domain symbol, and mapping the expanded sequence to the specified frequency domain width or time domain symbol;

or, when the set numeric value is greater than a quantity of subcarriers corresponding to the specified frequency domain bandwidth or time domain symbol, intercepting a part of the Zadoff-Chu sequence whose sequence length is the set numeric value, so that an intercepted length is equal to the quantity of subcarriers corresponding to the specified frequency domain bandwidth or time domain symbol, and mapping the intercepted sequence to the specified frequency domain bandwidth or time domain symbol.

The sequence for sending an NLRS may further be obtained according to a synchronization level of a base station.

Specifically, first, according to a synchronization level of a base station and a set pseudorandom initialized sequence, an initialized sequence that corresponds to the synchronization level and is used for sending the NLRS is obtained.

The set pseudorandom initialized sequence includes: a pseudorandom initialized sequence of each orthogonal frequency-division multiplexing OFDM symbol of an initialized sequence of a common reference signal CRS or an initialized sequence of a channel state information-reference signal CSI-RS; or, a pseudorandom initialized sequence of an initialized sequence of a dedicated signal DRS or an initialized sequence of a demodulation signal DMRS.

Next, by using the pseudorandom generation sequence, a pseudorandom sequence for the NLRS is generated from the obtained initialized sequence for the NLRS.

Finally, a sequence for sending the NLRS, corresponding to the synchronization level is obtained according to the generated pseudorandom sequence for the NLRS.

For example, first, according to the synchronization level of the base station, by using a pseudorandom initialized sequence of each orthogonal frequency-division multiplexing OFDM symbol of an initialized sequence of a common reference signal CRS or an initialized sequence of a channel state information-reference signal CSI-RS, an initialized generated sequence, for an NLRS, corresponding to the synchronization level is obtained through calculation in the following manner:

$$c_{init}=2^{10} \cdot (7 \cdot (n_s+1)+l+1) \cdot (2 \cdot N\_\text{stratum}+1)+2 \cdot N\_\text{stratum}+N_{CP}$$

where $c_{init}$ is an initialized generated sequence of the sequence for an NLRS, N_stratum is the synchronization level of the base station, $n_s$ is a timeslot number inside one frame, 1 is an OFDM symbol number inside one timeslot, and $$N_{CP} = \begin{cases} 1 & \text{for normal } CP \\ 0 & \text{for extended } CP \end{cases}.$$

Second, the obtained initialized generated sequence $c_{init}$ for the sequence for the NLRS is substituted into a pseudorandom generation formula, so as to obtain a pseudorandom sequence c(n):

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_C=1600$, $x_1(0)=1$, $x_1(n)=0$, n=1, 2, . . . , 30, and sequence initialization of x2 is obtained by using $$c_{init} = \sum_{i=0}^{30} x_2(i) \cdot 2^i.$$

Third, the pseudorandom sequence is substituted into a formula for generating an NLRS sequence, so as to obtain a sequence r for the NLRS:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, xN_{RB}^{max,NLRS} - 1,$$

where x is a quantity of REs occupied by the sequence for the NLRS in one OFDM of one PRB, and $N_{RB}^{max,NLRS}$ is a quantity of downlink RBs occupied by an NLRS.

For another example, first, according to the synchronization level of the base station, by using a formula for generating an initialized sequence of a dedicated reference signal DRS or an initialized sequence of a demodulation pilot DMRS, the initialized generated sequence for the NLRS is obtained through calculation in the following manner:

$$c_{init}=(\lfloor n_s/2 \rfloor+1) \cdot (2N\_\text{stratum}+1) \cdot 2^{16}$$

where $c_{init}$ is an initialized generated sequence of the sequence for an NLRS, N_stratum is the synchronization level of the base station, and $n_s$ is a timeslot number inside one frame.

Second, the obtained initialized generated sequence $c_{init}$ for the sequence for the NLRS is substituted into a pseudorandom generation formula, so as to obtain a pseudorandom sequence c(n):

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_C=1600$, $x_1(0)=1$, $x_1(n)=0$, n=1, 2, . . . , 30, and sequence initialization of x2 is obtained by using $$c_{init} = \sum_{i=0}^{30} x_2(i) \cdot 2^i.$$

Third, the pseudorandom sequence is substituted into a formula for generating an NLRS sequence, so as to obtain a sequence r for the NLRS:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, xN_{RB}^{max,NLRS} - 1$$

where $N_{RB}^{max,NLRS}$ is a quantity of downlink RBs occupied by an NLRS, and x is a quantity of REs occupied by an NLRS sequence in one PRB. For example, in a normal subframe, x=12, and in an expanded subframe, x=16.

It should be noted that, between different base stations having a same synchronization level, time domain resources for sending an NLRS are the same, frequency domain resources are the same, and the manner of sending a same NLRS on the time domain resource and the frequency domain resource is also referred to as a single frequency network (SFN) manner. That is, different base stations having a same synchronization level use a same resource for sending an NLRS. That is, time domain resources are the same, frequency domain resources are the same, and code resources are the same.

Case 2: The resource includes a time domain resource and a frequency domain resource.

Time domain resources in resources for sending an NLRS by different base stations having a same synchronization level are different;

or, frequency domain resources in resources for sending an NLRS by different base stations having a same synchronization level are different;

or, time domain resources and frequency domain resources in resources for sending an NLRS by different base stations having a same synchronization level are different;

or, the time domain resource and/or frequency domain resource determined by the base station is unusable by another base station having a same synchronization level;

or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

In such a case in which it is determined that time domain resources and/or frequency domain resources are different in resources for sending an NLRS by different base stations having a same synchronization level, that different base stations having a same synchronization level send the NLRS according to the determined resource meets that: staying, by the base station when another base station having a same level sends an NLRS, silent on the determined resource; and, sending, by the base station when the another base station having a same level stays silent, the NLRS on the determined resource, so as to avoid mutual interference between different base stations having a same synchronization level when the different base stations send the NLRS on the determined resource, thereby further avoiding occurrence of an error in acquired synchronization clock information caused by interference when base stations perform network listening, so that accuracy of clock synchronization between base stations can be effectively improved.

It should be noted that, for different base stations having a same synchronization level, time domain resources for sending an NLRS are different and/or frequency domain resources are different, and the manner for sending an NLRS on the time domain resource and frequency domain resource is also referred to as a silent manner. That is, different base stations having a same synchronization level use different resources for sending an NLRS. That is, time domain resources are different and/or frequency domain resources are different, and whether code resources for sending an NLRS are the same is not limited.

Rule 2:

For a case in which synchronization levels are different, an established mapping relationship between a synchronization level and a resource for sending an NLRS meets that: resources for sending an NLRS that correspond to at least two adjacent synchronization levels are different.

The resource includes a time domain resource, a frequency domain resource, and a code domain resource.

Case 1:

The resources for sending an NLRS that correspond to at least two adjacent synchronization levels are determined by different time domain information located in a same subframe.

A resource, for sending an NLRS, that corresponds to at least a first adjacent synchronization level is determined by using a first time domain of one subframe, a resource for sending an NLRS, corresponding to at least a second synchronization level adjacent to the first synchronization level is determined by using a second time domain of the subframe, and a time length between the first time domain and the second time domain is at least separated by a set base station uplink/downlink switching time length.

Specifically, different time domain information may be denoted by using different orthogonal frequency-division multiplexing OFDM symbols.

That is, the resources for sending an NLRS that correspond to at least two adjacent synchronization levels are determined by different orthogonal frequency-division multiplexing OFDM symbols located in a same subframe.

Figure 4:
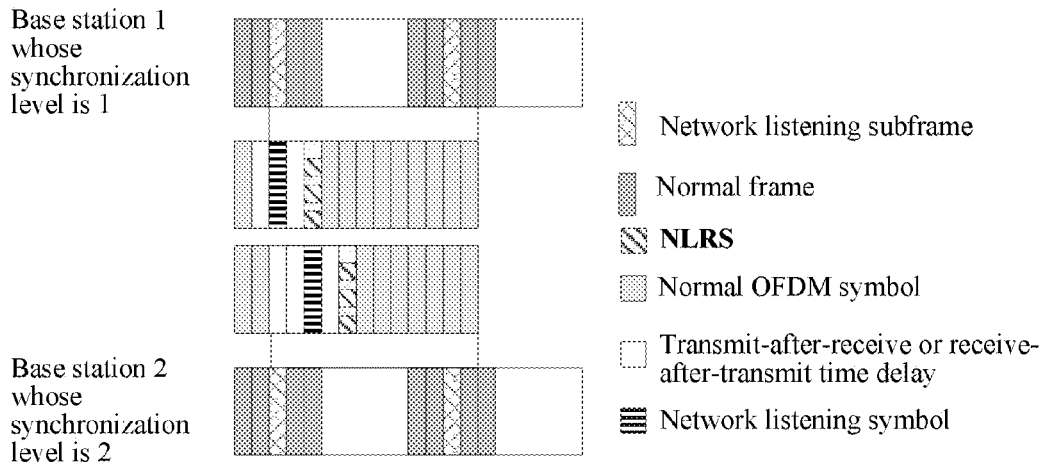
FIG. 4 is a schematic structural diagram of resource position information that is determined by different base stations having different synchronization levels and is used for sending an NLRS.

FIG. 4 is a schematic structural diagram of resources that are determined by different base stations having different synchronization levels and used for sending an NLRS.

For example, by means of predefining, it is determined that a resource for sending an NLRS by a base station whose synchronization level is 0 is the $m_0^{th}$ OFDM symbol located in the $M^{th}$ subframe; it is determined that a resource for sending an NLRS by a base station whose synchronization level is 1 is the $m_1^{th}$ OFDM symbol located in the $M^{th}$ subframe; it is determined that a resource for sending an NLRS by a base station whose synchronization level is 2 is the $m_2^{th}$ OFDM symbol located in the $M^{th}$ subframe; . . . ; and it is determined that a resource for sending an NLRS by a base station whose synchronization level is k is the $m_k^{th}$ OFDM symbol located in the $M^{th}$ subframe, where $m_1$ is not equal to $m_2$, $m_{k-1}$ is not equal to $m_k$, and $m_k$ and $m_{k-1}$ are at least separated by one OFDM symbol.

It should be noted that, time domain resources and frequency domain resources for sending an NLRS by different base stations having different synchronization levels may be located on one OFDM symbol of one subframe, or may be located on multiple OFDM symbols of one subframe, which is not limited here.

Case 2:

The resources for sending an NLRS that correspond to at least two adjacent synchronization levels are determined by orthogonal frequency-division multiplexing OFDM symbols located in different subframes.

Specifically, there are at least two adjacent synchronization levels: a first synchronization level and a second synchronization level. A resource for sending an NLRS of the first synchronization level is any OFDM symbol located in a first subframe, and a resource for sending an NLRS of the second synchronization level is any OFDM symbol located in a second subframe.

Figure 5:
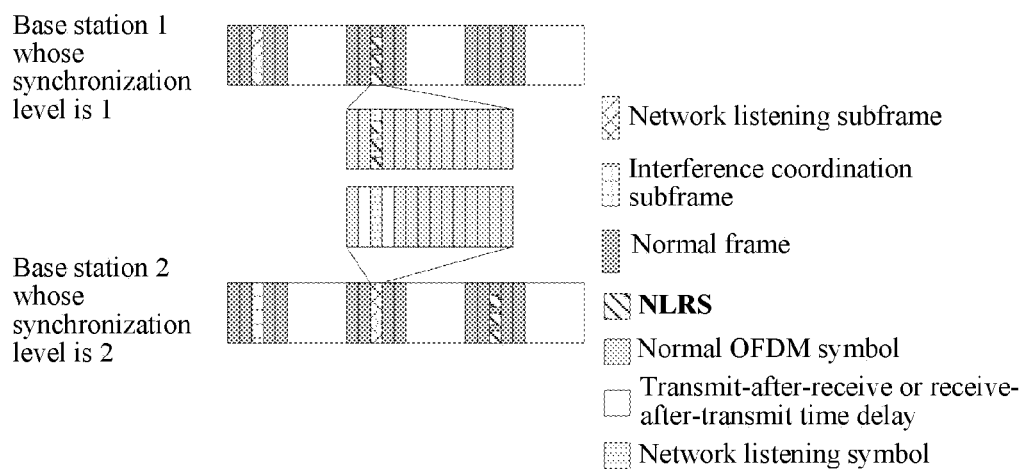
FIG. 5 is a schematic structural diagram of resource position information that is determined by different base stations having different synchronization levels and is used for sending an NLRS.

FIG. 5 is a schematic structural diagram of resources that are determined by different base stations having different synchronization levels and used for sending an NLRS.

For example, by means of predefining, it is determined that a resource for sending an NLRS by a base station whose synchronization level is 0 is the $m_0^{th}$ OFDM symbol located in the $M_0^{th}$ subframe; it is determined that a resource for sending an NLRS by a base station whose synchronization level is 1 is the $m_1^{th}$ OFDM symbol located in the $M_1^{th}$ subframe; it is determined that a resource for sending an NLRS by a base station whose synchronization level is 2 is the $m_2^{th}$ OFDM symbol located in the $M_2^{th}$ subframe; . . . ; and it is determined that a resource for sending an NLRS by a base station whose synchronization level is k is the $m_k^{th}$ OFDM symbol located in the $M_k^{th}$ subframe, where $M_1$ is not equal to $M_2$, and $M_{k-1}$ is not equal to $M_k$.

It should be noted that, resources for sending an NLRS by base stations having different synchronization levels may be located on one same OFDM symbol of different subframes, or may be located on different OFDM symbols of different subframes, which is not limited here.

Rule 3:

In a case in which synchronization levels are different, an established mapping relationship between a synchronization level and a resource for sending an NLRS meets that: resources for sending an NLRS by different base stations having different synchronization levels are different.

Specifically, time domain resources in resources for sending an NLRS by different base stations having different synchronization levels are different;

or, frequency domain resources in resources for sending an NLRS by different base stations having different synchronization levels are different;

or, the time domain resource and/or frequency domain resource determined by the base station is unusable by another base station having a different synchronization level.

In another embodiment of the present invention, in such a case in which determined resources for sending an NLRS by different base stations having different synchronization levels are different, that different base stations having different synchronization levels send the NLRS according to the determined resource may further meets: staying, by the base station when another base station having a different level sends an NLRS, silent on the determined resource, and sending data on another resource than the determined resource; and, sending, by the base station when the another base station having a different level stays silent, the NLRS on the determined resource, thereby further avoiding occurrence of an error in acquired synchronization clock information caused by interference when base stations perform network listening, so that accuracy of clock synchronization between base stations can be effectively improved.

Rule 4:

In a case in which synchronization levels are different, an established mapping relationship between a synchronization level and a resource for sending an NLRS meets that: in different base stations corresponding to N synchronization levels, at most N−1 different base stations having different synchronization levels use a same time domain resource for sending an NLRS, where N is a positive integer and N is greater than 1;

or, in different base stations corresponding to N synchronization levels, the time domain resource determined by the base station is the same as a time domain resource that is usable by at most N−2 base stations having different synchronization levels for sending an NLRS;

or, in the mapping relationship between the synchronization level and a time domain resource for sending an NLRS, for different base stations corresponding to N synchronization levels, at most N−1 different synchronization levels correspond to only one time domain resource for sending an NLRS.

That is, in a system having multiple synchronization levels, a time domain resource for sending an NLRS by a base station having at least one synchronization level is different from a time domain resource for sending an NLRS by a base station having another synchronization level.

For example, it is assumed that four synchronization levels, synchronization level 1, synchronization level 2, synchronization level 3, and synchronization level 4, exist in one system. A time domain resource for sending an NLRS by base stations corresponding to synchronization level 1, synchronization level 2, and synchronization level 3 is subframe 1. Therefore, on the time domain resource, synchronization level 4 is used for receiving NLRSs sent by the base stations corresponding to synchronization level 1, synchronization level 2, and synchronization level 3.

A time domain resource for sending an NLRS by base stations corresponding to synchronization level 1, synchronization level 2, and synchronization level 4 is subframe 2. Therefore, on the time domain resource, synchronization level 3 is used for receiving NLRSs sent by the base stations corresponding to synchronization level 1, synchronization level 2, and synchronization level 4.

A time domain resource for sending an NLRS by base stations corresponding to synchronization level 1, synchronization level 3, and synchronization level 4 is subframe 3. Therefore, on the time domain resource, synchronization level 2 is used for receiving NLRSs sent by the base stations corresponding to synchronization level 1, synchronization level 3, and synchronization level 4.

A time domain resource for sending an NLRS by base stations corresponding to synchronization level 4, synchronization level 2, and synchronization level 3 is subframe 4. Therefore, on the time domain resource, synchronization level 1 is used for receiving NLRSs sent by the base stations corresponding to synchronization level 4, synchronization level 2, and synchronization level 3.

Figure 6:
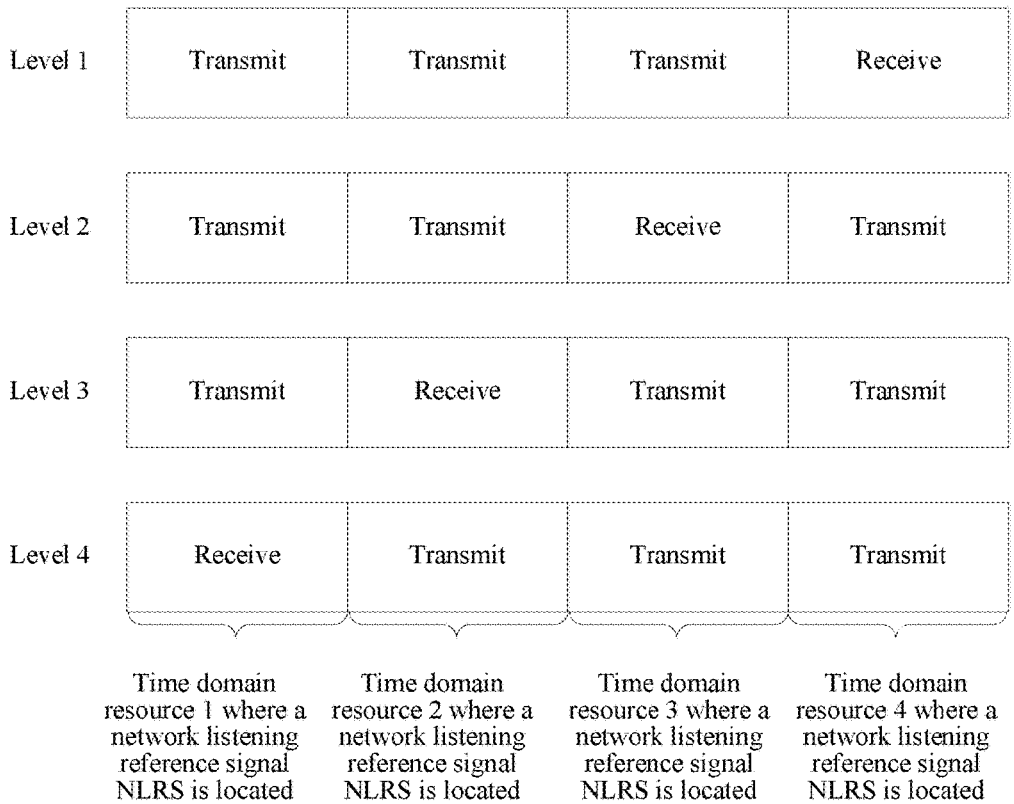
FIG. 6 is a schematic structural diagram of resource position information that is determined by different base stations having different synchronization levels and is used for sending an NLRS.

FIG. 6 is a schematic structural diagram of resources that are determined by different base stations having different synchronization levels and used for sending an NLRS.

It should be noted that a time domain resource for sending an NLRS here may be understood as one or multiple subframes, and therefore, same time domain resources for sending an NLRS may be understood as same subframes for sending an NLRS. For example, a time domain resource for sending an NLRS may be one subframe, or may also be multiple continuous subframes, or may be multiple noncontinuous subframes. For a base station to be synchronized other than a synchronization source base station, an NLRS sent by a synchronization source base station is received on a time domain resource for sending an NLRS by a synchronization source base station.

In this embodiment of the present invention, even though not a same OFDM symbol is occupied when NLRSs are sent under different synchronization levels, if a same subframe is occupied for sending the NLRSs, it may also be considered that time domain resources for sending the NLRSs are the same.

In this way, on any one time domain resource for sending an NLRS, 2 or more base stations having different levels send NLRSs. On this time domain resource, a base station that receives an NLRS may detect, on one time domain resource, NLRSs sent by the 2 or more base stations having different levels. Even though a synchronization source base station needs to be searched for again because of loss of synchronization, multiple base stations having different synchronization levels may still be found inside a same time domain resource, thereby reducing the time required for searching for a synchronization source base station again.

In such a case in which time domain resources in determined resources for sending an NLRS by different base stations having different synchronization levels are the same, that different base stations having different synchronization levels send the NLRS according to the determined resource meets: staying, by the base station when multiple base stations in N−2 base stations that have a same time domain resource and different levels send an NLRS, silent on the determined resource, and sending data on another resource than the determined resource; and, sending, by the base station when multiple base stations in the N−2 base stations that have a same time domain resource and different levels stay silent, the NLRS on the determined resource, so as to avoid mutual interference between different base stations having different synchronization levels when the different base stations send the NLRS on the determined resource, thereby further avoiding occurrence of an error in acquired synchronization clock information caused by interference when base stations perform network listening, so that accuracy of clock synchronization between base stations can be effectively improved.

Step 102: The base station sends the NLRS according to the determined resource.

In step 102, for different base stations having different synchronization levels, after a resource for sending an NLRS is determined, the NLRS is sent.

Specifically, when resources that are determined by different base stations having different synchronization levels and used for sending an NLRS are different (time domain resources in resources for sending an NLRS by different base stations having different synchronization levels are different; or, frequency domain resources in resources for sending an NLRS by different base stations having different synchronization levels are different; or, the time domain resource and/or frequency domain resource determined by the base station is unusable by another base station having a different synchronization level), when another base station having a different level sends an NLRS, the base station stays silent on the determined resource, and sends data on another resource than the determined resource; and, when the another base station having a different level stays silent, the base station sends the NLRS on the determined resource.

When in different base stations corresponding to N synchronization levels, at most N−1 different base stations having different synchronization levels use a same time domain resource for sending an NLRS (where N is a positive integer and N is greater than 1; or, in different base stations corresponding to N synchronization levels, the time domain resource determined by the base station is the same as a time domain resource that is usable by at most N−2 base stations having different synchronization levels for sending an NLRS; or, in the mapping relationship between the synchronization level and a time domain resource for sending an NLRS, for different base stations corresponding to N synchronization levels, at most N−1 different synchronization levels correspond to only one time domain resource for sending an NLRS), when multiple base stations in N−2 base stations that have a same time domain resource and different levels send an NLRS, the base station stays silent on the determined resource, and sends data on another resource than the determined resource; and, when multiple base stations in the N−2 base stations that have a same time domain resource and different levels stay silent, the base station sends the NLRS on the determined resource.

However, for different base stations having a same synchronization level, there are two manners of determining a resource for sending an NLRS, and therefore, for different determination results, manners of sending an NLRS are also different.

When different base stations having a same synchronization level determine that time domain resources are the same and frequency domain resources are the same in resources carrying the NLRSs, the different base stations having a same synchronization level send a same sequence for the NLRS on the determined time domain resource and frequency domain resource, so as to avoid mutual interference that occurs between different base stations having a same synchronization level when the different base stations send the NLRSs on the determined same time domain resources and same frequency domain resources, thereby further avoiding occurrence of an error in acquired synchronization clock information caused by interference when base stations perform network listening, so that accuracy of clock synchronization between base stations can be effectively improved.

A sequence for sending an NLRS is obtained in at least one manner in the following: generated from a pseudorandom sequence;

or, generated from a Zadoff-Chu sequence;

or, generated from a machine generated sequence.

Alternatively, the sequence for sending an NLRS may further be obtained according to a synchronization level.

It should be noted that, for different base stations having a same synchronization level, time domain resources for sending an NLRS are the same, and frequency domain resources are the same, and the manner of sending a same sequence for an NLRS on the time domain resource and the frequency domain resource is also referred to as a single frequency network (SFN) manner. That is, different base stations having a same synchronization level use a same resource for sending an NLRS. That is, time domain resources are the same, frequency domain resources are the same, and code resources are the same.

In a case in which time domain resources are different and/or frequency domain resources are different in resources that are determined by different base stations having a same synchronization level and used for sending an NLRS, that different base stations having a same synchronization level send the NLRS according to the determined resource meets: staying, by the base station when another base station having a same level sends an NLRS, silent on the determined resource; and, sending, by the base station when the another base station having a same level stays silent, the NLRS on the determined resource, so as to avoid mutual interference between different base stations having a same synchronization level when the different base stations send the NLRS on the determined resource, thereby further avoiding occurrence of an error in acquired synchronization clock information caused by interference when base stations perform network listening, so that accuracy of clock synchronization between base stations can be effectively improved.

It should be noted that, for different base stations having a same synchronization level, time domain resources for sending an NLRS are different and/or frequency domain resources are different, and the manner of sending an NLRS on the time domain resource and the frequency domain resource is also referred to as a silent manner. That is, resources for sending an NLRS by different base stations having a same synchronization level are different. That is, time domain resources are different and/or frequency domain resources are different, and whether code resources for sending an NLRS are the same is not limited.

It should be noted that, a manner of staying silent is used when different base stations having a same synchronization level send an NLRS, and sequences for sending an NLRS by different base stations having a same synchronization level may be the same, or may also be different. A manner for generating an NLRS sequence may be determined in the manner in step 101, which is not elaborated here.

Similarly, different base stations having a same synchronization level use a manner of staying silent to send an NLRS, or may use a manner of staying silent to send a discovery reference signal (DRS). That is, resources for sending a DRS by different base stations having a same synchronization level may be determined in a manner of determining a resource for sending an NLRS, and a base station stays silent when another base station having a same synchronization level sends a DRS, so that a DRS signal can not only be used for discovering a base station, but also be used to implement clock synchronization between base stations.

Step 103: The base station sends the determined resource for sending an NLRS to user equipment by using set signaling or by using a specified signaling format.

In step 103, the user equipment is instructed to determine, according to the received resource, a zero power signal and determine resource position information for data rate matching and/or data puncturing.

A signaling format of the set signaling is the same as the specified signaling format.

The specified signaling format may include at least one of the following: zeroTxPowerCSI-RS-r10 signaling, CSI-RS-ConfigZP-r11 signaling and CSI-IM-Config-r11 signaling, and CSI-RS-r10 signaling and CSI-RS-ConfigNZPId-r11 signaling; or may be signaling in another format that can be recognized by another user equipment, which is not limited here.

It should be noted that, the set signaling is used for informing the user equipment that the signaling carries an NLRS for clock synchronization. The specified signaling format is solely used for carrying a zero power CSI-RS signal, or a CSI-IMR signal, or a CSI-RS signal, and does not notify whether a type of a signal sent by the user equipment includes NLRS.

After the base station sends the determined resource for sending an NLRS to user equipment by using set signaling or by using a specified signaling format, the user equipment determines a zero power signal according to the received resource, and determines resource position information for data rate matching and/or data puncturing.

Optionally, the base station sends the determined resource for sending an NLRS to user equipment by using set signaling.

The specified signaling may include at least one of the following: zeroTxPowerCSI-RS-r10 signaling, CSI-RS-ConfigZP-r11 signaling and CSI-IM-Config-r11 signaling, and CSI-RS-r10 signaling and CSI-RS-ConfigNZPId-r11 signaling; or may be signaling in another format that can be recognized by another user equipment, which is not limited here.

The user equipment receives an NLRS signal according to the received resource for the NLRS, and performs clock synchronization with the base station by using the received NLRS signal.

It should be noted that, step 103 is not an essential step in this embodiment of the present invention.

For user equipment that supports a different network system, when sending an NLRS, a base station may further configure the NLRS in an MBSFN subframe or a guard interval GP.

Optionally, the base station indicates, at a determined position for sending the MBSFN subframe by using a physical control format indication channel PCFICH, that a physical downlink control channel PDDCH occupies x OFDM symbols which is sent to user equipment, and notify the user not to perform downlink scheduling at the subframe, where x may be 1 or 2.

Alternatively, the base station notifies, by using an enhanced physical downlink control channel EPDDCH, a data transmission area to send the acquired position for sending the data information to user equipment starting from the $x^{th}$ OFDM symbol of the current subframe, and instructs the user equipment to receive user data according to the received position information, where x is greater than 2.

By means of the solutions in Embodiment 1 of the present invention, a synchronization source base station determines, according to a synchronization level of the synchronization source base station, a resource for sending a network listening reference signal for clock synchronization between base stations, and sends the NLRS according to the determined resource. In this way, one network listening reference signal for clock synchronization between base stations is configured on each synchronization source base station, and the network listening reference signal is sent on a resource determined according to a synchronization level of the synchronization source base station, so that a synchronization base station that acquires the network listening reference signal can determine the synchronization level of the synchronization source base station according to a resource for sending the NLRS, thereby avoiding occurrence of an error in determining a synchronization level of a base station caused by lack of CRS configuration when a CRS signal is used as a synchronization signal, improving accuracy that a synchronization base station determines a synchronization level of a synchronization source base station, and further enhancing synchronization accuracy that a synchronization base station tracks synchronization with a synchronization source base station.

Embodiment 2

Figure 7:
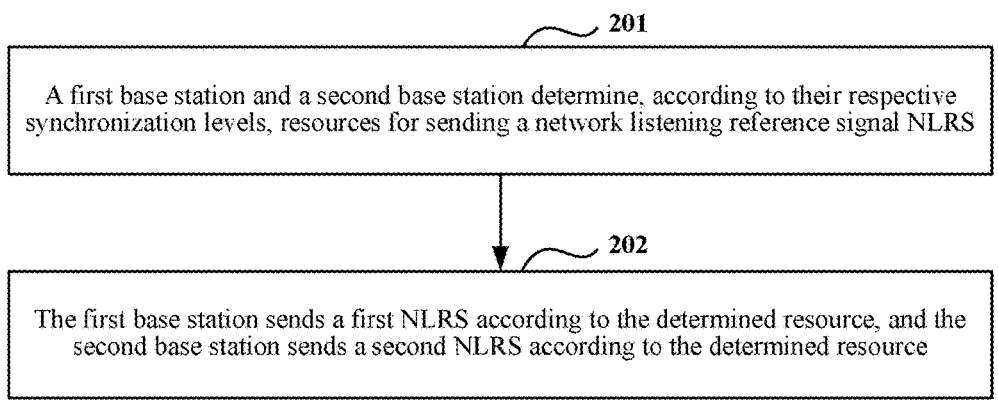
FIG. 7 is a schematic flowchart of a method for sending a synchronization signal according to Embodiment 2 of the present invention.

FIG. 7 is a schematic flowchart of a method for sending a synchronization signal according to Embodiment 2 of the present invention. Embodiment 2 of the present invention is a solution in the same inventive concept as Embodiment 1 of the present invention. A first base station and a second base station having a same synchronization level are used as an example, and a synchronization signal is sent by means of a single frequency network. The method specifically includes:

Step 201: A first base station and a second base station determine, according to their respective synchronization levels, resources for sending a network listening reference signal NLRS.

The NLRS is used for clock synchronization between base stations, and the resource includes at least one of the following: a time domain resource, a frequency domain resource, and a code domain resource.

In step 201, a manner in which the first base station and the second base station determine a resource for sending a network listening reference signal NLRS includes, but is not limited to the following several manners:

Manner 1: Obtaining in a manner of negotiation between the first base station and the second base station.

Because synchronization levels of the first base station and the second base station are the same, after negotiation between the first base station and the second base station, it is determined that a resource for sending a network listening reference signal NLRS by the first base station is the same as a resource for sending a network listening reference signal NLRS by the second base station.

Manner 2: The first base station and the second base station acquire resources for sending a network listening reference signal NLRS from a network side.

The network side sends a pre-established mapping relationship between a synchronization level and a resource for sending an NLRS to the first base station and the second base station. The first base station and the second base station determine resources for sending an NLRS according to the received mapping relationship between a synchronization level and a resource for sending an NLRS and their respective synchronization levels.

Alternatively, after determining that the synchronization levels of the first base station and the second base station are the same, the network side determines that resources for sending an NLRS by the first base station and the second base station are the same, specifies one resource for sending an NLRS for the first base station and the second base station, and sends the resource to the first base station and the second base station.

It should be noted that the determining that the resources for sending an NLRS by the first base station and the second base station are the same refers to: First, a time domain resource in the determined resource for sending an NLRS by the first base station is the same as a time domain resource in the determined resource for sending an NLRS by the second base station, a frequency domain resource in the determined resource for sending an NLRS by the first base station is the same as a frequency domain resource in the determined resource for sending an NLRS by the second base station, and a code resource in the determined resource for sending an NLRS by the first base station is the same as a code resource in the determined resource for sending an NLRS by the second base station;

or, second, the resource determined by the base station is the same as a resource that is usable by another base station having a same synchronization level for sending an NLRS;

or, third, in the mapping relationship between the synchronization level and a resource for sending an NLRS, one synchronization level corresponds to only one resource for sending an NLRS.

That is, for multiple base stations of each synchronization level, there is only one resource for sending an NLRS.

Step 202: The first base station sends a first NLRS according to the determined resource, and the second base station sends a second NLRS according to the determined resource.

A sequence for the first NLRS and a sequence for the second NLRS are the same.

The sequence for sending an NLRS is obtained in at least one manner in the following: generated from a pseudorandom sequence;

or, generated from a Zadoff-Chu sequence;

or, generated from a machine generated sequence.

That the sequence for sending an NLRS is generated from a Zadoff-Chu sequence specifically includes:

mapping a Zadoff-Chu sequence whose sequence length is a set numeric value to a specified frequency domain bandwidth or time domain symbol; and when the set numeric value is equal to a quantity of subcarriers corresponding to the specified frequency domain bandwidth or time domain symbol, directly mapping the Zadoff-Chu sequence whose sequence length is the set numeric value to the specified frequency domain bandwidth or time domain symbol;

or, when the set numeric value is less than a quantity of subcarriers corresponding to the specified frequency domain bandwidth or time domain symbol, periodically expanding the Zadoff-Chu sequence whose sequence length is the set numeric value on a frequency domain or a time domain, so that a length of the expanded sequence is equal to the quantity of subcarriers corresponding to the specified frequency domain bandwidth or time domain symbol, and mapping the expanded sequence to the specified frequency domain width or time domain symbol;

or, when the set numeric value is greater than a quantity of subcarriers corresponding to the specified frequency domain bandwidth or time domain symbol, intercepting a part of the Zadoff-Chu sequence whose sequence length is the set numeric value, so that an intercepted length is equal to the quantity of subcarriers corresponding to the specified frequency domain bandwidth or time domain symbol, and mapping the intercepted sequence to the specified frequency domain bandwidth or time domain symbol.

The sequence for sending an NLRS may further be obtained according to a synchronization level of a base station.

Specifically, first, according to a synchronization level of a base station and a set pseudorandom initialized sequence, an initialized sequence of an NLRS is obtained.

The set pseudorandom initialized sequence is: a pseudorandom initialized sequence of each orthogonal frequency-division multiplexing OFDM symbol of an initialized sequence of a common reference signal CRS or an initialized sequence of a channel state information-reference signal CSI-RS; or, a pseudorandom initialized sequence of an initialized sequence of a dedicated signal DRS or an initialized sequence of a demodulation signal DMRS.

Next, by using a pseudorandom generation sequence, a pseudorandom sequence for the NLRS is generated from the obtained initialized sequence for the NLRS.

Finally, according to the generated pseudorandom sequence for the NLRS, information of the sequence for the NLRS is obtained.

For example: first, according to a synchronization level of a base station, by using formula for generating a pseudorandom initialized sequence of each orthogonal frequency-division multiplexing OFDM symbol of an initialized sequence of a common reference signal CRS or an initialized sequence of a channel state information-reference signal CSI-RS, an initialized generated sequence for the NLRS is obtained through calculation in the following manner:

$$c_{init}=2^{10}\cdot(7\cdot(n_s+1)+l+1)\cdot(2\cdot N\_stratum+1)+2\cdot N\_stratum+N_{CP}$$

where $c_{init}$ is an initialized generated sequence of the sequence for an NLRS, N_stratum is the synchronization level of the base station, $n_s$ is a timeslot number inside one frame, l is an OFDM symbol number inside one timeslot, and $$N_{CP}=\begin{cases}1 & \text{for normal } CP\\ 0 & \text{for extended } CP\end{cases}.$$

Second, the obtained initialized generated sequence for the sequence for the NLRS is substituted into a pseudorandom generation formula, so as to obtain a pseudorandom sequence c(n):

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_c=1600$, $x_1(1)=1$, $x_1(n)=0$, n=1, 2, ..., 30, and sequence initialization of x2 is obtained by using $$c_{init}=\sum_{i=0}^{30}x_2(i)\cdot 2^i.$$

Third, the pseudorandom sequence is substituted into a formula for generating an NLRS sequence, so as to obtain a sequence r for the NLRS:

$$r(m)=\frac{1}{\sqrt{2}}(1-2\cdot c(2m))+j\frac{1}{\sqrt{2}}(1-2\cdot c(2m+1)),$$

$$m=0,1,\ldots,xN_{RB}^{max,NLRS}-1,$$

where x is a quantity of REs occupied by the sequence for the NLRS in one OFDM of one PRB.

For another example, first, according to the synchronization level of the base station, by using a formula for generating an initialized sequence of a dedicated reference signal (DRS) or an initialized sequence of a demodulation pilot (DMRS), an initialized generated sequence for the NLRS is obtained through calculation in the following manner $$c_{init}=(\lfloor n_s/2\rfloor+1)\cdot(2N\_stratum+1)\cdot 2^{16}$$

where $c_{init}$ is an initialized generated sequence of the sequence for an NLRS, N_stratum is the synchronization level of the base station, and $n_s$ is a timeslot number inside one frame.

Second, the obtained initialized generated sequence $c_{init}$ for the sequence for the NLRS is substituted into a pseudorandom generation formula, so as to obtain a pseudorandom sequence c(n):

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_c=1600$, $x_1(1)=1$, $x_1(n)=0$, n=1, 2, ..., 30, and sequence initialization of x2 is obtained by using $$c_{init}=\sum_{i=0}^{30}x_2(i)\cdot 2^i.$$

Third, the pseudorandom sequence is substituted into a formula for generating an NLRS sequence, so as to obtain a sequence r for the NLRS:

$$r(m)=\frac{1}{\sqrt{2}}(1-2\cdot c(2m))+j\frac{1}{\sqrt{2}}(1-2\cdot c(2m+1)),$$

$$m=0,1,\ldots,xN_{RB}^{max,NLRS}-1$$

where $N_{RB}^{max,NLRS}$ is a quantity of downlink RBs occupied by an NLRS, and x is a quantity of REs occupied by an NLRS sequence in one PRB. For example, in a normal subframe, x=12, and in an expanded subframe, x=16.

It should be noted that for different base stations having a same synchronization level, time domain resources for sending an NLRS are the same, and frequency domain resources are the same, and the manner of sending a same sequence for an NLRS on the time domain resource and the frequency domain resource is also referred to as a single frequency network (SFN) manner. That is, different base stations having a same synchronization level use a same resource for sending an NLRS. That is, time domain resources are the same, frequency domain resources are the same, and code resources are the same.

In the manner in Embodiment 2 of the present invention, in a case in which time domain resources and frequency domain resources are both the same in determined resources for sending an NLRS in different base stations having a same synchronization level, different base stations having a same synchronization level send the NLRSs having a same code resource, so as to avoid mutual interference that occurs between different base stations having a same synchronization level when the different base stations send the NLRSs on a same time domain resource and same frequency domain resource, thereby further avoiding occurrence of an error in acquired synchronization clock information caused by interference when base stations perform network listening, so that accuracy of clock synchronization between base stations can be effectively improved.

Embodiment 3

Figure 8:
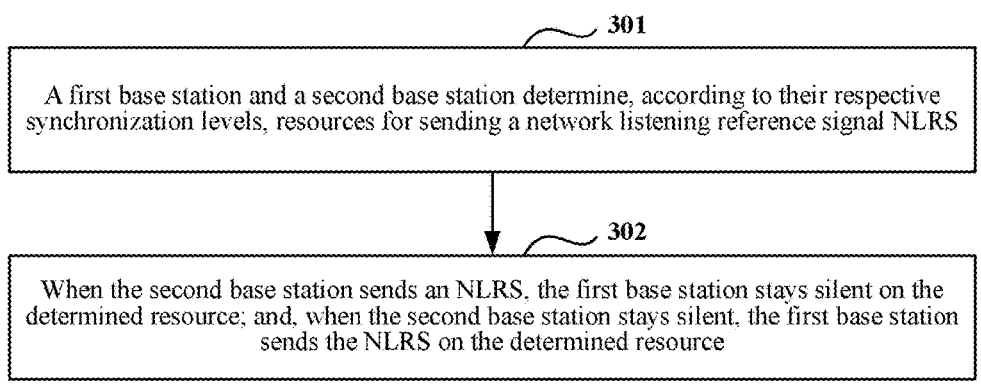
FIG. 8 is a schematic flowchart of a method for sending a synchronization signal according to Embodiment 3 of the present invention.

FIG. 8 is a schematic flowchart of a method for sending a synchronization signal according to Embodiment 3 of the present invention. Embodiment 3 of the present invention is a solution in the same inventive concept as Embodiment 1 of the present invention. A first base station and a second base station having a same synchronization level are used as an example A synchronization signal is sent in a silent form. The method specifically includes:

Step 301: A first base station and a second base station determine, according to their respective synchronization levels, resources for sending a network listening reference signal NLRS.

The NLRS is used for clock synchronization between base stations, and the resource includes at least one of the following: a time domain resource, a frequency domain resource, and a code domain resource.

In step 301, a manner in which the first base station and the second base station determine resources for sending a network listening reference signal NLRS includes, but is not limited to the following several manners:

Manner 1: Obtaining in a manner of negotiation between the first base station and the second base station.

Because synchronization levels of the first base station and the second base station are the same, after negotiation between the first base station and the second base station, it is determined that the resource for sending a network listening reference signal NLRS by the first base station is different from the resource that is determined by the second base station and used for sending a network listening reference signal NLRS.

Manner 2: The first base station and the second base station acquire resources for sending a network listening reference signal NLRS from a network side.

The network side sends a preset mapping relationship between a synchronization level and a resource for sending an NLRS to the first base station and the second base station. The first base station and the second base station determine resources for sending an NLRS according to the received mapping relationship between a synchronization level and a resource for sending an NLRS and their respective synchronization levels. The resource that is determined by the first base station and used for sending an NLRS is different from the resource for sending an NLRS by the second base station.

Alternatively, after determining that the synchronization levels of the first base station and the second base station are the same, the network side determines that resources for sending an NLRS by the first base station and the second base station are different, specifies one resource for sending an NLRS for the first base station and one resource for sending an NLRS for the second base station, and sends the resources to the first base station and the second base station.

That the resource that is determined by the first base station for sending an NLRS is different from the resource for sending an NLRS by the second base station specifically includes that:

a time domain resource in the resource that is determined by the first base station and used for sending an NLRS is different from a time domain resource in the resource for sending an NLRS by the second base station;

or, a frequency domain resource in the resource that is determined by the first base station and used for sending an NLRS is different from a frequency domain resource in the resource for sending an NLRS by the second base station.

or, a time domain resource and/or frequency domain resource that is determined by the first base station for sending an NLRS is unusable by the second base station;

or, the synchronization levels of the first base station and the second base station correspond to at least two a resource for sending an NLRS, one resource that is determined by the first base station and used for sending an NLRS and another resource that is determined by the second base station and used for sending an NLRS meet that: time domain resources and/or frequency domain resources in the resources are different.

That is, in the mapping relationship between the synchronization level and a resource for sending an NLRS, one synchronization level corresponds to at least two resources for sending an NLRS, and time domain resources and/or frequency domain resources in the at least two resources for sending an NLRS are different.

Step 302: When the second base station sends an NLRS, the first base station stays silent on the determined resource; and, when the second base station stays silent, the first base station sends the NLRS on the determined resource.

In step 302, because the time domain resource in the resource that is determined by the first base station and used for sending the NLRS is different from the time domain resource in the resource that is determined by the second base station and used for sending the NLRS, or the frequency domain resource in the resource that is determined by the first base station and used for sending the NLRS is different from the frequency domain resource in the resource that is determined by the second base station and used for sending the NLRS, when the first base station sends the NLRS according to the determined resource, the second base station stays silent on the determined resource and does not send a downlink signal, so as to avoid mutual interference between different base stations having a same synchronization level when the different base stations send NLRSs in a case in which time domain resources are different and/or frequency domain resources are different in determined resources, thereby further avoiding occurrence of an error in acquired synchronization clock information caused by interference when base stations perform network listening, so that accuracy of clock synchronization between base stations can be effectively improved.

It should be noted that, for different base stations having a same synchronization level, time domain resources for sending an NLRS are different and/or frequency domain resources are different, and the manner of sending an NLRS on the time domain resource and the frequency domain resource is also referred to as a silent manner. That is, resources for sending an NLRS by different base stations having a same synchronization level are different. That is, time domain resources are different and/or frequency domain resources are different. Whether code resources for sending an NLRS are the same is not limited.

In addition, the solution in Embodiment 2 of the present invention and the solution in Embodiment 3 of the present invention may be used in combination. For example, the SFN manner is used when different base stations having a same synchronization level send an NLRS, and the silent manner is used when different base stations having at least adjacent and different synchronization levels send an NLRS, so that not only interference between signals can be effectively avoided, but also accuracy of synchronization between base stations can be improved.

Embodiment 4

Figure 9:
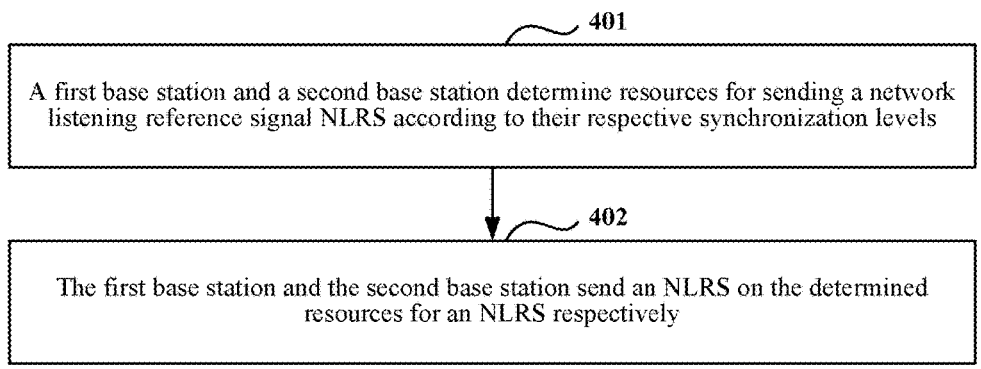
FIG. 9 is a schematic flowchart of a method for synchronization between base stations according to Embodiment 4 of the present invention.

FIG. 9 is a schematic flowchart of a method for synchronization between base stations according to Embodiment 4 of the present invention. Embodiment 4 of the present invention is an invention in the same inventive concept as Embodiment 1 of the present invention to Embodiment 3 of the present invention. A first base station and a second base station involved in Embodiment 4 of the present invention are different synchronization source base stations having different synchronization levels. The method may be shown as follows:

Step 401: A first base station and a second base station determine resources for sending a network listening reference signal NLRS according to their respective synchronization levels.

The NLRS is used for clock synchronization between base stations, and the resource includes at least one of the following: a time domain resource, a frequency domain resource, and a code domain resource.

In step 401, a manner in which the first base station and the second base station determine resources for sending a network listening reference signal NLRS includes, but is not limited to the following several manners:

Manner 1: Obtaining in a manner of negotiation between the first base station and the second base station.

Because synchronization levels of the first base station and the second base station are different, after negotiation between the first base station and the second base station, it is determined that the resource for sending a network listening reference signal NLRS by the first base station is different from the resource that is determined by the second base station and used for sending a network listening reference signal NLRS.

Manner 2: The first base station and the second base station acquire resources for sending a network listening reference signal NLRS from a network side.

The network side sends a preset mapping relationship between a synchronization level and a resource for sending an NLRS to the first base station and the second base station. The first base station and the second base station determine resources for sending an NLRS according to the received mapping relationship between a synchronization level and a resource for sending an NLRS and their respective synchronization levels. The resource that is determined by the first base station and used for sending an NLRS is different from the resource for sending an NLRS by the second base station.

Alternatively, after determining that the synchronization levels of the first base station and the second base station are different, the network side determines that resources for sending an NLRS by the first base station and the second base station are different, specifies one resource for sending an NLRS for the first base station and one resource for sending an NLRS for the second base station, and sends the resources to the first base station and the second base station separately.

That the resource that is determined by the first base station for sending an NLRS is different from the resource for sending an NLRS by the second base station specifically includes that:

a time domain resource in the resource that is determined by the first base station and used for sending an NLRS is different from a time domain resource in the resource for sending an NLRS by the second base station;

or, a frequency domain resource in the resource that is determined by the first base station and used for sending an NLRS is different from a frequency domain resource in the resource for sending an NLRS by the second base station.

or, a time domain resource and/or frequency domain resource that is determined by the first base station for sending an NLRS is unusable by the second base station;

or, for a resource for sending an NLRS, corresponding to the synchronization level of the first base station and a resource for sending an NLRS, corresponding to the synchronization level of the second base station, one resource that is determined by the first base station and used for sending an NLRS and another resource that is determined by the second base station and used for sending an NLRS meet that: time domain resources and/or frequency domain resources are different in the resources.

In another embodiment of the present invention, in a case in which synchronization levels are different, an established mapping relationship between a synchronization level and a resource for sending an NLRS meets that: in different base stations corresponding to N synchronization levels, at most N−1 different base stations having different synchronization levels use a same time domain resource for sending an NLRS, where N is a positive integer and N is greater than 1;

or, in different base stations corresponding to N synchronization levels, the time domain resource determined by the base station is the same as a time domain resource that is usable by at most N−2 base stations having different synchronization levels for sending an NLRS;

or, in the mapping relationship between the synchronization level and a time domain resource for sending an NLRS, for different base stations corresponding to N synchronization levels, at most N−1 different synchronization levels correspond to only one time domain resource for sending an NLRS.

That is, in a system having multiple synchronization levels, a time domain resource for sending an NLRS by a base station having at least one synchronization level is different from a time domain resource for sending an NLRS by a base station having another synchronization level.

For example, it is assumed that four synchronization levels, that is, synchronization level 1, synchronization level 2, synchronization level 3, and synchronization level 4, exist in one system. A time domain resource for sending an NLRS by base stations corresponding to synchronization level 1, synchronization level 2, and synchronization level 3 is subframe 1. Therefore, on the time domain resource, synchronization level 4 is used for receiving NLRSs sent by the base stations corresponding to synchronization level 1, synchronization level 2, and synchronization level 3.

A time domain resource for sending an NLRS by base stations corresponding to synchronization level 1, synchronization level 2, and synchronization level 4 is subframe 2. Therefore, on the time domain resource, synchronization level 3 is used for receiving NLRSs sent by the base stations corresponding to synchronization level 1, synchronization level 2, and synchronization level 4.

A time domain resource for sending an NLRS by base stations corresponding to synchronization level 1, synchronization level 3, and synchronization level 4 is subframe 3. Therefore, on the time domain resource, synchronization level 2 is used for receiving NLRSs sent by the base stations corresponding to synchronization level 1, synchronization level 3, and synchronization level 4.

A time domain resource for sending an NLRS by base stations corresponding to synchronization level 4, synchronization level 2, and synchronization level 3 is subframe 4. Therefore, on the time domain resource, synchronization level 1 is used for receiving NLRSs sent by the base stations corresponding to synchronization level 4, synchronization level 2, and synchronization level 3.

It should be noted that a time domain resource for sending an NLRS here may be understood as one or multiple subframes, and therefore, same time domain resources for sending an NLRS may be understood as same subframes for sending an NLRS. For example, a time domain resource for sending an NLRS may be one subframe, or may also be multiple continuous subframes, or may be multiple noncontinuous subframes. For a base station to be synchronized other than a synchronization source base station, an NLRS sent by a synchronization source base station is received on a time domain resource for sending an NLRS by a synchronization source base station.

In this embodiment of the present invention, even though not a same OFDM symbol is occupied when NLRSs are sent on different synchronization levels, if a same subframe is occupied for sending the NLRSs, it may still be considered that time domain resources for sending the NLRSs are the same.

Step 402: The first base station and the second base station send NLRSs on the determined resources for an NLRS respectively.

In step 402, because the time domain resource in the resource that is determined by the first base station and used for sending the NLRS is different from the time domain resource in the resource that is determined by the second base station and used for sending the NLRS, or the frequency domain resource in the resource that is determined by the first base station and used for sending the NLRS is different from the frequency domain resource in the resource that is determined by the second base station and used for sending the NLRS, when the first base station sends the NLRS according to the determined resource, the second base station stays silent on the determined resource, and sends data on another resource than the determined resource, and, when the second base station having a different level stays silent, the first base station sends the NLRS on the determined resource, thereby further avoiding occurrence of an error in acquired synchronization clock information caused by interference when base stations perform network listening, so that accuracy of clock synchronization between base stations can be effectively improved.

Alternatively, in a case in which time domain resources in determined resources for sending an NLRS by different base stations having different synchronization levels are the same, that different base stations having different synchronization levels send the NLRS according to the determined resource meets: staying, by the base station when multiple base stations in N−2 base stations that have a same time domain resource and different levels send an NLRS, silent on the determined resource, and sending data on another resource than the determined resource; and, sending, by the base station when multiple base stations in the N−2 base stations that have a same time domain resource and different levels stay silent, the NLRS on the determined resource, so as to avoid mutual interference between different base stations having different synchronization levels when the different base stations send the NLRS on the determined resource, thereby further avoiding occurrence of an error in acquired synchronization clock information caused by interference when base stations perform network listening, so that accuracy of clock synchronization between base stations can be effectively improved.

It should be noted that, for different base stations having different synchronization levels, time domain resources for sending an NLRS are different and/or frequency domain resources are different, and the manner of sending an NLRS on the time domain resource and the frequency domain resource is also referred to as a silent manner. That is, different base stations having different synchronization levels use different resources for sending an NLRS. That is, time domain resources are different and/or frequency domain resources are different, and whether code resources for sending an NLRS are the same is not limited.

Embodiment 5

Figure 10:
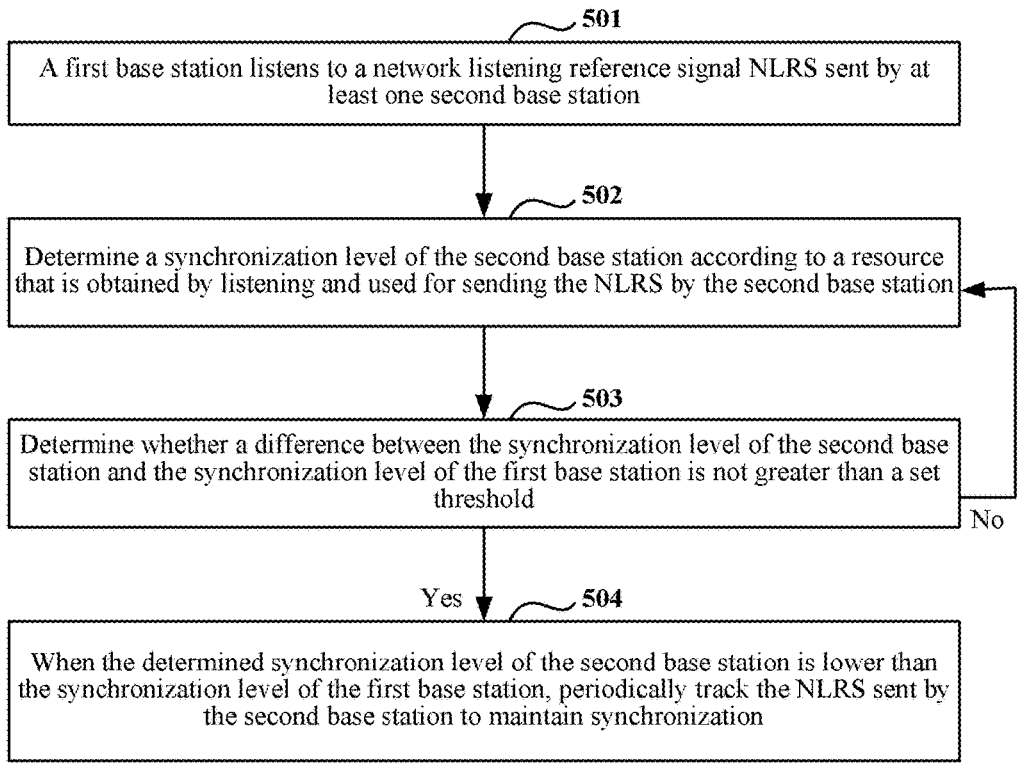
FIG. 10 is a schematic flowchart of a method for synchronization between base stations according to Embodiment 5 of the present invention.

FIG. 10 is a schematic flowchart of a method for synchronization between base stations according to Embodiment 5 of the present invention. Embodiment 5 of the present invention is an inventive solution in the same inventive concept as Embodiment 1 of the present invention to Embodiment 4 of the present invention. A first base station and a second base station involved in Embodiment 5 of the present invention may be different base stations having a same synchronization level, or may also be different base stations having different synchronization levels, where the second base station refers to another base station different from the first base station. The method includes:

Step 501: A first base station listens to a network listening reference signal NLRS sent by at least one second base station.

In step 501, the first base station is a base station to be synchronized, and once being powered on to work, the first base station continuously listens to a network listening reference signal for clock synchronization sent by another base station.

For example, once being powered on to work, the first base station first receives a detectable synchronization reference signal (for example, a primary reference signal (PSS) or a secondary reference signal (SSS) sent by another base station.

Next, initial synchronization information is acquired according to the detected synchronization reference signal.

The initial synchronization information at least includes: timing synchronization information, and frequency synchronization information.

Finally, a network listening reference signal NLRS is acquired according to the acquired initial synchronization information.

Optionally, the first base station configures the network listening reference signal NLRS that is sent by the at least one second base station and is obtained by listening in a multimedia broadcast multicast service single frequency network MBSFN subframe or a guard interval GP.

Step 502: Determine a synchronization level of the second base station according to a resource that is obtained by listening and used for sending the NLRS by the second base station.

In step 502, a synchronization level of the second base station, corresponding to the resource that is obtained by listening and used for sending the NLRS by the second base station is determined according to a pre-established mapping relationship between a synchronization level and a resource for sending an NLRS.

Step 503: Determine whether a difference between the synchronization level of the second base station and the synchronization level of the first base station is not greater than a set threshold, and if yes, perform step 504, or if not, continue to perform step 502 to determine a synchronization level of a next second base station.

In step 503, a manner for determining a synchronization level of the first base station includes, but is not limited to, the following manner:

Manner 1:

When the first base station is a multicarrier base station, first, different NLRSs for separate synchronization of multiple carriers in the first base station are determined.

When one base station has multiple carrier resources, a network listening reference signal, of another base station, detected on each carrier resource is different, and therefore, synchronization information of synchronization of each piece of carrier resource is also different.

Next, a synchronization level of the carrier is obtained according to an NLRS for synchronization of one carrier.

Finally, synchronization levels corresponding to the multiple carriers of the first base station are compared with the synchronization level of the first base station, and a lowest synchronization level is determined as the synchronization level of the first base station.

Manner 2:

When the first base station is a base station in an initialized state, a set maximum value of synchronization level in a communications network system is determined, and the determined maximum value of synchronization level is used as the synchronization level of the first base station.

Optionally, after the synchronization level of the second base station is determined, the method further includes:

performing comparison to find whether the found synchronization level of the second base station is the same as the synchronization level of the first base station;

when the found synchronization level of the second base station is the same as the synchronization level of the first base station, determining that the second base station is a base station whose synchronization level is the same as that of the first base station; or when the found synchronization level of the second base station is different from the synchronization level of the first base station, determining that the second base station is a base station whose synchronization level is different from that of the first base station.

Moreover, after it is determined that the second base station is a base station whose synchronization level is the same as that of the first base station, when the second base station sends the NLRS on the resource that is obtained by listening and used for sending the NLRS by the second base station, the first base station stays silent on the resource that is obtained by listening and used for sending the NLRS by the second base station, and, when the second base station stays silent on the resource that is obtained by listening and used for sending the NLRS by the second base station, the first base station sends the NLRS on the resource that is obtained by listening and used for sending the NLRS by the second base station.

Alternatively, after it is determined that the second base station is a base station whose synchronization level is the same as that of the first base station, when the first base station obtains, through listening, a resource used for sending the NLRS by the second base station, the first base station uses the resource that is obtained by listening and used for sending the NLRS by the second base station as the resource for sending the NLRS by the first base station.

After it is determined that the second base station is a base station whose synchronization level is different from that of the first base station, when the second base station sends the NLRS on the resource that is obtained by listening and used for sending the NLRS by the second base station, the first base station stays silent on the resource that is obtained by listening and used for sending the NLRS by the second base station, and sends data on another resource except the resource for the NLRS;

and, when the second base station stays silent on the resource that is obtained by listening and used for sending the NLRS by the second base station, the first base station sends the NLRS on the resource that is obtained by listening and used for sending the NLRS by the second base station.

Step 504: When the determined synchronization level of the second base station is lower than the synchronization level of the first base station, periodically track the NLRS sent by the second base station to maintain synchronization.

In step 504, a second base station having a lowest synchronization level is selected, from second base stations whose determined synchronization levels are lower than the synchronization level of the first base station, as a synchronization source base station for synchronization tracking of the first base station, and the NLRS sent by the determined synchronization source base station is periodically tracked, to perform an operation of synchronization maintenance.

Optionally, the first base station configures the network listening reference signal NLRS that is sent by the at least one second base station and is obtained by listening in a multimedia broadcast multicast service single frequency network MBSFN subframe or a guard interval GP.

By means of the solution in Embodiment 4 of the present invention, a synchronization base station listens to an NLRS sent by a synchronization source base station, acquires a resource for sending the NLRS by the synchronization source base station, so as to obtain a synchronization level of the synchronization source base station, and when it is determined that the synchronization level of the synchronization source base station is the lowest, maintains synchronization periodically. In this way, a synchronization level of a synchronization source base station can be accurately determined, thereby further improving synchronization between base stations.

Embodiment 6

Figure 11:
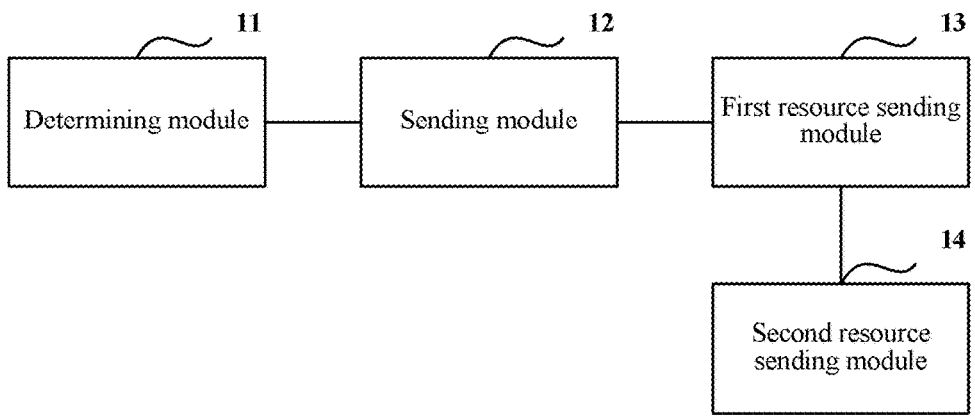
FIG. 11 is a schematic structural diagram of a device for sending a synchronization signal according to Embodiment 6 of the present invention.

FIG. 11 is a schematic structural diagram of a device for sending a synchronization signal according to Embodiment 6 of the present invention. Embodiment 6 of the present invention is an invention in the same inventive concept as Embodiment 1 of the present invention to Embodiment 5 of the present invention. The device includes: a determining module 11 and a sending module 12.

The determining module 11 is configured to determine a resource for sending a network listening reference signal NLRS according to a synchronization level of the device, where the NLRS is used for clock synchronization between base stations.

The sending module 12 is configured to send the NLRS on the resource determined according to the determining module 11.

Specifically, the determining module 11 is specifically configured to determine the resource for sending the NLRS according to the synchronization level of the device and a mapping relationship between the synchronization level and a resource for sending an NLRS.

The mapping relationship between the synchronization level and a resource for sending an NLRS specifically includes that:

different base stations having a same synchronization level use a same resource for sending an NLRS;

or, the resource determined by the base station is the same as a resource that is usable by another base station having a same synchronization level for sending an NLRS;

or, in the mapping relationship between the synchronization level and a resource for sending an NLRS, one synchronization level corresponds to only one resource for sending an NLRS;

where the resource includes at least one of the following: a time domain resource, a frequency domain resource, and a code resource.

The resource includes a time domain resource and a frequency domain resource; and the mapping relationship between the synchronization level and a resource for sending an NLRS specifically includes that:

time domain resources in resources for sending an NLRS by different base stations having a same synchronization level are different;

or, frequency domain resources in resources for sending an NLRS by different base stations having a same synchronization level are different;

or, the time domain resource and/or frequency domain resource determined by the base station is unusable by another base station having a same synchronization level;

or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

Specifically, the sending module 12 is specifically configured to stay silent on the determined resource when another base station having a same level sends an NLRS;

and, when the another base station having a same level stays silent, send the NLRS on the determined resource.

The mapping relationship between the synchronization level and a resource for sending an NLRS specifically includes that:

time domain resources in resources for sending an NLRS by different base stations having different synchronization levels are different;

or, frequency domain resources in resources for sending an NLRS by different base stations having different synchronization levels are different;

or, the time domain resource and/or frequency domain resource determined by the base station is unusable by another base station having a different synchronization level.

The sending module 12 is specifically configured to: when another base station having a different level sends an NLRS, stay silent on the determined resource, and send data on another resource than the determined resource;

and, when the another base station having a different level stays silent, send the NLRS on the determined resource.

The resource includes: a time domain resource; and the mapping relationship between the synchronization level and a resource for sending an NLRS specifically includes that:

in different base stations corresponding to N synchronization levels, at most N−1 different base stations having different synchronization levels use a same time domain resource for sending an NLRS, where N is a positive integer and N is greater than 1;

or, in different base stations corresponding to N synchronization levels, the time domain resource determined by the base station is the same as a time domain resource that is usable by at most N−2 base stations having different synchronization levels for sending an NLRS;

or, in the mapping relationship between the synchronization level and a time domain resource for sending an NLRS, for different base stations corresponding to N synchronization levels, at most N−1 different synchronization levels correspond to only one time domain resource for sending an NLRS.

The sending module 12 is specifically configured to: when multiple base stations in N−2 base stations that have a same time domain resource and different levels send an NLRS, stay silent on the determined resource, and send data on another resource than the determined resource;

and, when multiple base stations in the N−2 base stations that have a same time domain resource and different levels stay silent, send the NLRS on the determined resource.

The mapping relationship between the synchronization level and a resource for sending an NLRS specifically includes that:

resources for sending an NLRS that correspond to at least two adjacent synchronization levels are different;

where the resource includes a time domain resource, a frequency domain resource, and a code resource.

That the resources for sending an NLRS that correspond to at least two adjacent synchronization levels are different specifically includes that:

the resources for sending an NLRS that correspond to at least two adjacent synchronization levels are determined by different time domain information located in a same subframe, where a resource, for sending an NLRS, that corresponds to at least a first adjacent synchronization level is determined by using a first time domain of one subframe, a resource for sending an NLRS, corresponding to at least a second synchronization level adjacent to the first synchronization level is determined by using a second time domain of the subframe, and a time length between the first time domain and the second time domain is at least separated by a set base station uplink/downlink switching time length.

That the resources for sending an NLRS that correspond to at least two adjacent synchronization levels are determined by different time domain information located in a same subframe specifically includes that:

the resources for sending an NLRS that correspond to at least two adjacent synchronization levels are determined by different orthogonal frequency-division multiplexing OFDM symbols located in a same subframe.

That the resources for sending an NLRS that correspond to at least two adjacent synchronization levels are different specifically includes that:

the resources for sending an NLRS that correspond to at least two adjacent synchronization levels are determined by orthogonal frequency-division multiplexing OFDM symbols located in different subframes.

The code resource includes an NLRS sequence; and the sequence for sending an NLRS is obtained in at least one manner in the following:

generated from a pseudorandom sequence;

or, generated from a Zadoff-Chu sequence;

or, generated from a machine generated sequence.

That the sequence for sending an NLRS is generated from a Zadoff-Chu sequence specifically includes:

mapping a Zadoff-Chu sequence whose sequence length is a set numeric value to a specified frequency domain bandwidth or time domain symbol; and when the set numeric value is equal to a quantity of subcarriers corresponding to the specified frequency domain bandwidth or time domain symbol, mapping the Zadoff-Chu sequence whose sequence length is the set numeric value to the specified frequency domain bandwidth or time domain symbol;

or, when the set numeric value is less than a quantity of subcarriers corresponding to the specified frequency domain bandwidth or time domain symbol, periodically expanding the Zadoff-Chu sequence whose sequence length is the set numeric value on a frequency domain or a time domain, so that a length of the expanded sequence is equal to that of the specified frequency domain bandwidth or time domain symbol, and mapping the expanded sequence to the specified frequency domain width or time domain symbol;

or, when the set numeric value is greater than a quantity of subcarriers corresponding to the specified frequency domain bandwidth or time domain symbol, intercepting a part of the Zadoff-Chu sequence whose sequence length is the set numeric value, so that an intercepted length is equal to the quantity of subcarriers corresponding to the specified frequency domain bandwidth or time domain symbol, and mapping the intercepted sequence to the specified frequency domain bandwidth or time domain symbol.

The NLRS for sending is obtained according to a synchronization level.

Specifically, that the NLRS for sending is obtained according to a synchronization level specifically includes:

obtaining an initialized sequence for sending the NLRS, corresponding to the synchronization level according to a synchronization level and a set pseudorandom initialized sequence;

generating a pseudorandom sequence for the NLRS from the obtained initialized sequence for the NLRS by using the set pseudorandom generation sequence; and obtaining, according to the generated pseudorandom sequence for the NLRS, a sequence for sending the NLRS, corresponding to the synchronization level.

The set pseudorandom initialized sequence is:

a pseudorandom initialized sequence of each orthogonal frequency-division multiplexing OFDM symbol of an initialized sequence of a common reference signal CRS or an initialized sequence of a channel state information-reference signal CSI-RS;

or, a pseudorandom initialized sequence of an initialized sequence of a dedicated signal DRS or an initialized sequence of a demodulation signal DMRS.

Optionally, the device further includes: a first resource sending module 13.

The first resource sending module is configured to: after the determining module 11 determines the resource for sending a network listening reference signal NLRS, send the determined resource for sending an NLRS to user equipment by using set signaling or by using a specified signaling format, and instruct the user equipment to determine, according to the received resource, a zero power signal and determine resource position information for data rate matching and/or data puncturing.

Optionally, the device further includes: a second resource sending module 14.

The second resource sending module 14 is configured to: after the NLRS is sent according to the resource determined by the determining module, send the determined resource for sending an NLRS to user equipment by using set signaling, and instruct the user equipment to receive an NLRS signal according to the received resource of the NLRS and perform clock synchronization with the base station by using the received NLRS signal.

It should be noted that the device in Embodiment 6 of the present invention may be a logical unit in a base station, or may be a physical entity in a base station. When the device is applied to a base station, once the base station utilizes the functions in Embodiment 6 of the present invention, the base station may be a synchronization source base station. The device may also be a network element entity on a side of a core network, which is not limited here.

Embodiment 7

Figure 12:
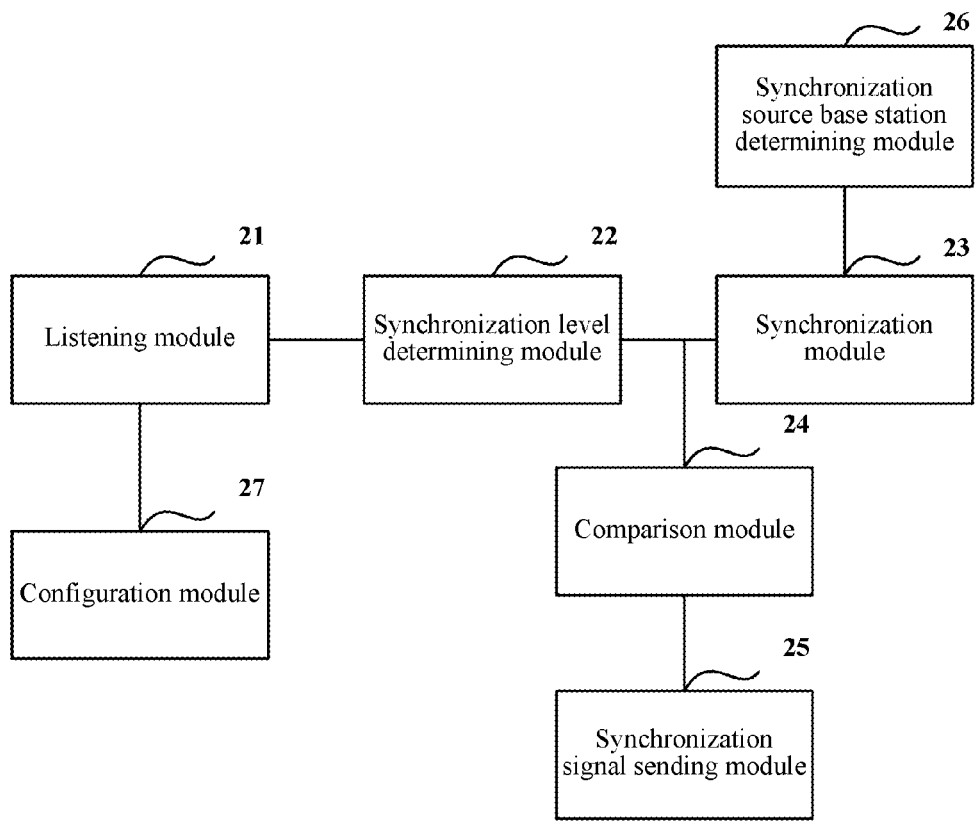
FIG. 12 is a schematic structural diagram of a device for synchronization between base stations according to Embodiment 7 of the present invention.

FIG. 12 is a schematic structural diagram of a device for synchronization between base stations according to Embodiment 7 of the present invention. Embodiment 7 of the present invention is an invention in the same inventive concept as Embodiment 1 of the present invention to Embodiment 5 of the present invention. The device includes: a listening module 21, a synchronization level determining module 22, and a synchronization module 23.

The listening module 21 is configured to listen to a network listening reference signal NLRS sent by at least one second base station.

The synchronization level determining module 22 is configured to determine a synchronization level of the second base station according to the resource that is obtained by listening by the listening module and used for sending the NLRS by the second base station.

The synchronization module 23 is configured to: when the synchronization level of the second base station determined by the synchronization level determining module is lower than a synchronization level of a current base station, periodically track the NLRS sent by the second base station to maintain synchronization.

Optionally, the device further includes: a comparison module 24.

The comparison module 24 is configured to: after the synchronization level determining module determines the synchronization level of the second base station, before it is determined that the synchronization level of the second base station is lower than the synchronization level of the current base station, perform comparison to find whether the found synchronization level of the second base station is the same as the synchronization level of the current base station;

when the found synchronization level of the second base station is the same as the synchronization level of the current base station, determine that the second base station is a base station whose synchronization level is the same as that of the current base station; or when the found synchronization level of the second base station is different from the synchronization level of the current base station, determine that the second base station is a base station whose synchronization level is different from that of the current base station.

Optionally, the device further includes: a synchronization signal sending module 25.

The synchronization signal sending module 25 is configured to: after the comparison module determines that the second base station is a base station whose synchronization level is the same as that of the current base station, when the second base station sends the NLRS on the resource that is obtained by listening and used for sending the NLRS by the second base station, stay silent on the resource that is obtained by listening and used for sending the NLRS by the second base station;

and, when the second base station stays silent on the resource that is obtained by listening and used for sending the NLRS by the second base station, send the NLRS on the resource that is obtained by listening and used for sending the NLRS by the second base station.

The synchronization signal sending module 25 is further configured to: after it is determined that the second base station is a base station whose synchronization level is different from that of the first base station, when the second base station sends the NLRS on the resource that is obtained by listening and used for sending the NLRS by the second base station, stay silent on the resource that is obtained by listening and used for sending the NLRS by the second base station, and send data on another resource except the resource for the NLRS; and, when the second base station stays silent on the resource that is obtained by listening and used for sending the NLRS by the second base station, send the NLRS on the resource that is obtained by listening and used for sending the NLRS by the second base station.

When the current base station is a multicarrier base station, the synchronization level of the current base station is determined in a following manner, specifically including:

determining different NLRSs for separate synchronization of multiple carriers in the current base station;

obtaining, according to an NLRS for synchronization of one carrier, a synchronization level of the carrier; and comparing synchronization levels correspond to the multiple carriers of the current base station with the synchronization level of the current base station, and determining a lowest synchronization level as the synchronization level of the current base station.

When the current base station is a base station in an initialized state, the synchronization level of the current base station is determined in a following manner, specifically including:

determining a set maximum value of synchronization level in a communications network system; and using the determined maximum value of synchronization level as the synchronization level of the current base station.

The synchronization level determining module 22 is specifically configured to search, according to a pre-established mapping relationship between a synchronization level and a resource for sending an NLRS, for the synchronization level of the second base station, corresponding to the resource that is obtained by listening by the listening module and used for sending the NLRS by the second base station.

The synchronization module 23 is specifically configured to determine whether a difference between the synchronization level of the second base station determined by the synchronization determining module and the synchronization level of the current base station is not greater than a set threshold; and when the difference between the synchronization level of the second base station and the synchronization level of the current base station is not greater than the set threshold, determine a synchronization level of the second base station lower than the synchronization level of the current base station.

Specifically, the device further includes: a synchronization source base station determining module 26.

The synchronization source base station determining module 26 is configured to: before the NLRS sent by the second base station to maintain synchronization is periodically tracked, select, from second base stations whose determined synchronization levels are lower than the synchronization level of the current base station, a second base station having a lowest synchronization level as a synchronization source base station for synchronization tracking of the current base station.

Optionally, the device further includes: a configuration module 27.

The configuration module 27 is configured to: after the listening module obtains, through listening, a network listening reference signal NLRS sent by at least one second base station, configure the network listening reference signal NLRS that is sent by the at least one second base station and is obtained by listening in a multimedia broadcast multicast service single frequency network MBSFN subframe or a guard interval GP.

It should be noted that the device in Embodiment 7 of the present invention may be a logical unit in a base station, or may be a physical entity in a base station. When the device is applied to a base station, once the base station utilizes the functions in Embodiment 7 of the present invention, the base station may be a synchronization base station. The device may also be a network element entity on a side of a core network, which is not limited here.

Embodiment 8

Figure 13:
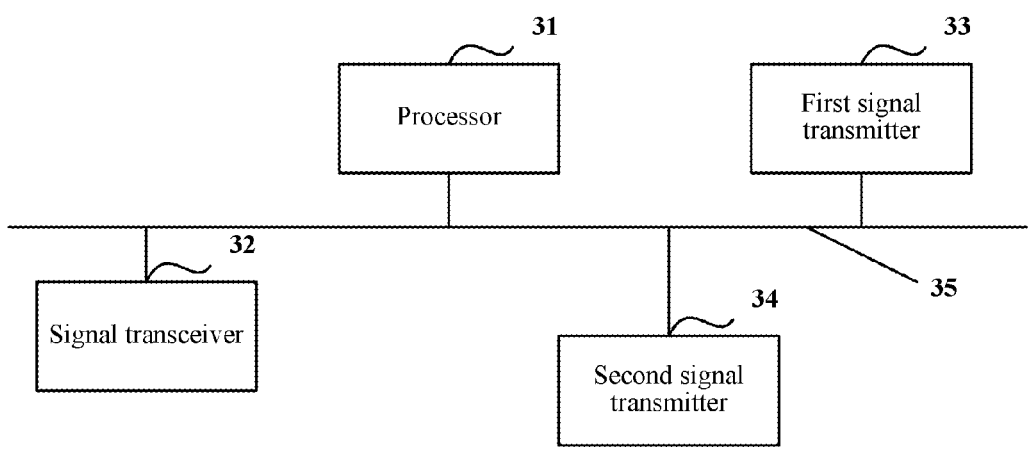
FIG. 13 is a schematic structural diagram of a synchronization source base station according to Embodiment 8 of the present invention.

FIG. 13 is a schematic structural diagram of a synchronization source base station according to Embodiment 8 of the present invention. Embodiment 8 of the present invention is an invention in the same inventive concept as Embodiment 1 of the present invention to Embodiment 5 of the present invention. The synchronization source base station includes: a processor 31 and a signal transceiver 32.

The processor 31 is configured to determine a resource for sending a network listening reference signal NLRS according to a synchronization level of the device, where the NLRS is used for clock synchronization between base stations.

The signal transceiver 32 is configured to send the NLRS according to the determined resource.

Specifically, the processor 31 is specifically configured to determine the resource for sending the NLRS according to the synchronization level of the device and a mapping relationship between the synchronization level and a resource for sending an NLRS.

The mapping relationship between the synchronization level and a resource for sending an NLRS specifically includes that:

different base stations having a same synchronization level use a same resource for sending an NLRS;

or, the resource determined by the base station is the same as a resource that is usable by another base station having a same synchronization level for sending an NLRS;

or, in the mapping relationship between the synchronization level and a resource for sending an NLRS, one synchronization level corresponds to only one resource for sending an NLRS;

where the resource includes at least one of the following: a time domain resource, a frequency domain resource, and a code resource.

The resource includes a time domain resource and a frequency domain resource; and the mapping relationship between the synchronization level and a resource for sending an NLRS specifically includes that:

time domain resources in resources for sending an NLRS by different base stations having a same synchronization level are different;

or, frequency domain resources in resources for sending an NLRS by different base stations having a same synchronization level are different;

or, the time domain resource and/or frequency domain resource determined by the base station is unusable by another base station having a same synchronization level;

or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

Specifically, the signal transceiver 32 is specifically configured to stay silent on the determined resource when another base station having a same level sends an NLRS;

and, when the another base station having a same level stays silent, send the NLRS on the determined resource.

The mapping relationship between the synchronization level and a resource for sending an NLRS specifically includes that:

time domain resources in resources for sending an NLRS by different base stations having different synchronization levels are different;

or, frequency domain resources in resources for sending an NLRS by different base stations having different synchronization levels are different;

or, the time domain resource and/or frequency domain resource determined by the base station is unusable by another base station having a different synchronization level.

The signal transceiver 32 is specifically configured to: when another base station having a different level sends an NLRS, stay silent on the determined resource, and send data on another resource than the determined resource;

and, when the another base station having a different level stays silent, send the NLRS on the determined resource.

The resource includes: a time domain resource; and the mapping relationship between the synchronization level and a resource for sending an NLRS specifically includes that:

in different base stations corresponding to N synchronization levels, at most N−1 different base stations having different synchronization levels use a same time domain resource for sending an NLRS, where N is a positive integer and N is greater than 1;

or, in different base stations corresponding to N synchronization levels, the time domain resource determined by the base station is the same as a time domain resource that is usable by at most N−2 base stations having different synchronization levels for sending an NLRS;

or, in the mapping relationship between the synchronization level and a time domain resource for sending an NLRS, for different base stations corresponding to N synchronization levels, at most N−1 different synchronization levels correspond to only one time domain resource for sending an NLRS.

The signal transceiver 32 is specifically configured to: when multiple base stations in N−2 base stations that have a same time domain resource and different levels send an NLRS, stay silent on the determined resource, and send data on another resource than the determined resource;

and, when multiple base stations in the N−2 base stations that have a same time domain resource and different levels stay silent, send the NLRS on the determined resource.

The mapping relationship between the synchronization level and a resource for sending an NLRS specifically includes that:

resources for sending an NLRS that correspond to at least two adjacent synchronization levels are different;

where the resource includes a time domain resource, a frequency domain resource, and a code resource.

That the resources for sending an NLRS that correspond to at least two adjacent synchronization levels are different specifically includes that:

the resources for sending an NLRS that correspond to at least two adjacent synchronization levels are determined by different time domain information located in a same subframe, where a resource, for sending an NLRS, that corresponds to at least a first adjacent synchronization level is determined by using a first time domain of one subframe, a resource for sending an NLRS, corresponding to at least a second synchronization level adjacent to the first synchronization level is determined by using a second time domain of the subframe, and a time length between the first time domain and the second time domain is at least separated by a set base station uplink/downlink switching time length.

That the resources for sending an NLRS that correspond to at least two adjacent synchronization levels are determined by different time domain information located in a same subframe specifically includes that:

the resources for sending an NLRS that correspond to at least two adjacent synchronization levels are determined by different orthogonal frequency-division multiplexing OFDM symbols located in a same subframe.

That the resources for sending an NLRS that correspond to at least two adjacent synchronization levels are different specifically includes that:

the resources for sending an NLRS that correspond to at least two adjacent synchronization levels are determined by different orthogonal frequency-division multiplexing OFDM symbols located in different subframes.

The code resource includes an NLRS sequence; and the sequence for sending an NLRS is obtained in at least one manner in the following:

generated from a pseudorandom sequence;

or, generated from a Zadoff-Chu sequence;

or, generated from a machine generated sequence.

That the sequence for sending an NLRS is generated from a Zadoff-Chu sequence specifically includes:

mapping a Zadoff-Chu sequence whose sequence length is a set numeric value to a specified frequency domain bandwidth or time domain symbol; and when the set numeric value is equal to a quantity of subcarriers corresponding to the specified frequency domain bandwidth or time domain symbol, mapping the Zadoff-Chu sequence whose sequence length is the set numeric value to the specified frequency domain bandwidth or time domain symbol;

or, when the set numeric value is less than a quantity of subcarriers corresponding to the specified frequency domain bandwidth or time domain symbol, periodically expanding the Zadoff-Chu sequence whose sequence length is the set numeric value on a frequency domain or a time domain, so that a length of the expanded sequence is equal to that of the specified frequency domain bandwidth or time domain symbol, and mapping the expanded sequence to the specified frequency domain width or time domain symbol;

or, when the set numeric value is greater than a quantity of subcarriers corresponding to the specified frequency domain bandwidth or time domain symbol, intercepting a part of the Zadoff-Chu sequence whose sequence length is the set numeric value, so that an intercepted length is equal to the quantity of subcarriers corresponding to the specified frequency domain bandwidth or time domain symbol, and mapping the intercepted sequence to the specified frequency domain bandwidth or time domain symbol.

The NLRS for sending is obtained according to a synchronization level.

Specifically, that the NLRS for sending is obtained according to a synchronization level specifically includes:

obtaining an initialized sequence for sending the NLRS, corresponding to the synchronization level according to a synchronization level and a set pseudorandom initialized sequence;

generating a pseudorandom sequence for the NLRS from the obtained initialized sequence for the NLRS by using the set pseudorandom generation sequence; and obtaining, according to the generated pseudorandom sequence for the NLRS, a sequence for sending the NLRS, corresponding to the synchronization level.

The set pseudorandom initialized sequence is:

a pseudorandom initialized sequence of each orthogonal frequency-division multiplexing OFDM symbol of an initialized sequence of a common reference signal CRS or an initialized sequence of a channel state information-reference signal CSI-RS;

or, a pseudorandom initialized sequence of an initialized sequence of a dedicated signal DRS or an initialized sequence of a demodulation signal DMRS.

Optionally, the synchronization source base station further includes: a first signal transmitter 33.

The first signal transmitter 33 is configured to: after a resource for sending the network listening reference signal NLRS is determined, send the determined resource for sending an NLRS to user equipment by using set signaling or by using a specified signaling format, and instruct the user equipment to determine, according to the received resource, a zero power signal and determine resource position information for data rate matching and/or data puncturing.

Optionally, the synchronization source base station further includes: a second signal transmitter 34.

The second signal transmitter 34 is configured to: after the NLRS is sent according to the determined resource, send the determined resource for sending an NLRS to user equipment by using set signaling, and instruct the user equipment to receive an NLRS signal according to the received resource of the NLRS and perform clock synchronization with the base station by using the received NLRS signal.

It should be noted that the processor 31, the signal transceiver 32, the first signal transmitter 33, and the second signal transmitter 34 are connected through a bus 35.

The device in Embodiment 8 of the present invention may be a logical unit in a base station, or may be a physical entity in a base station, or may be implemented in a software manner. When the device is applied to a base station, once the base station utilizes the functions in Embodiment 8 of the present invention, the base station may be a synchronization source base station. The device may also be a network element entity on a side of a core network, which is not limited here.

Embodiment 9

Figure 14:
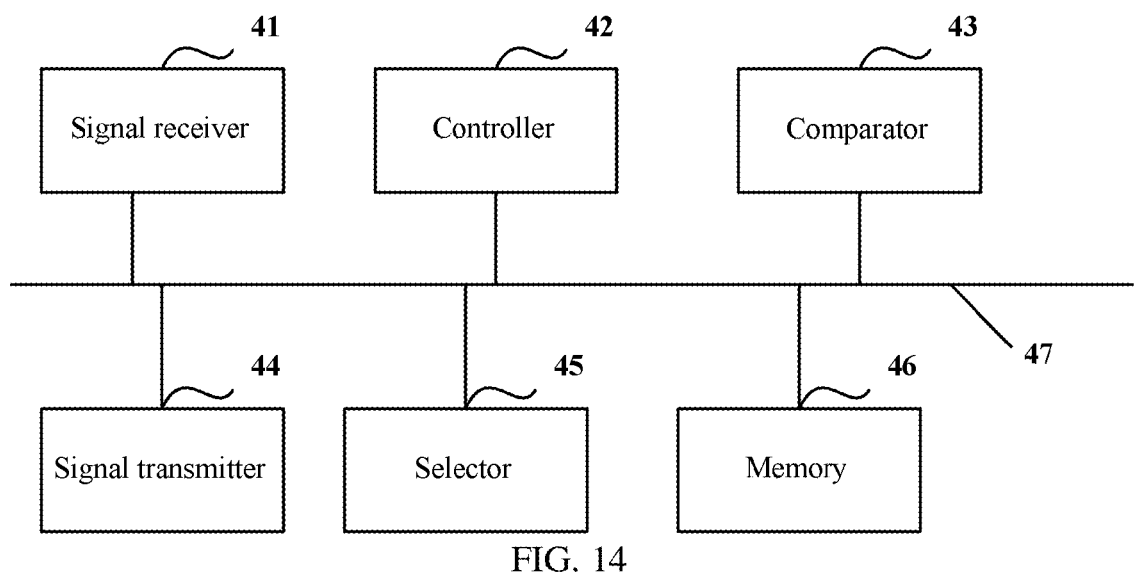
FIG. 14 is a schematic structural diagram of a synchronization base station according to Embodiment 9 of the present invention.

FIG. 14 is a schematic structural diagram of a synchronization base station according to Embodiment 9 of the present invention. Embodiment 9 of the present invention is an invention in the same inventive concept as Embodiment 1 of the present invention to Embodiment 5 of the present invention. The synchronization base station include: a signal receiver 41 and a controller 42.

The signal receiver 41 is configured to listen to a network listening reference signal NLRS sent by at least one second base station.

The controller 42 is configured to determine a synchronization level of the second base station according to a resource that is obtained by listening and used for sending the NLRS by the second base station, and when the synchronization level of the second base station determined by the synchronization level determining module is lower than a synchronization level of a current base station, periodically track the NLRS sent by the second base station to maintain synchronization.

Optionally, the synchronization base station further includes: a comparator 43.

The comparator 43 is configured to: after the synchronization level of the second base station is determined, before it is determined that the synchronization level of the second base station is lower than the synchronization level of the current base station, perform comparison to find whether the found synchronization level of the second base station is the same as the synchronization level of the current base station; and when the found synchronization level of the second base station is the same as the synchronization level of the current base station, determine that the second base station is a base station whose synchronization level is the same as that of the current base station; or when the found synchronization level of the second base station is different from the synchronization level of the current base station, determine that the second base station is a base station whose synchronization level is different from that of the current base station.

Optionally, the synchronization base station further includes: a signal transmitter 44.

The signal transmitter 44 is configured to: after it is determined that the second base station is a base station whose synchronization level is the same as that of the current base station, when the second base station sends the NLRS on the resource that is obtained by listening and used for sending the NLRS by the second base station, stay silent on the resource that is obtained by listening and used for sending the NLRS by the second base station;

and, when the second base station stays silent on the resource that is obtained by listening and used for sending the NLRS by the second base station, send the NLRS on the resource that is obtained by listening and used for sending the NLRS by the second base station.

The signal transmitter 44 is further configured to: after it is determined that the second base station is a base station whose synchronization level is different from that of the first base station, when the second base station sends the NLRS on the resource that is obtained by listening and used for sending the NLRS by the second base station, stay silent on the resource that is obtained by listening and used for sending the NLRS by the second base station, and send data on another resource except the resource for the NLRS; and, when the second base station stays silent on the resource that is obtained by listening and used for sending the NLRS by the second base station, send the NLRS on the resource that is obtained by listening and used for sending the NLRS by the second base station.

When the synchronization base station is a multicarrier base station, and a synchronization level of the synchronization base station is determined in a following manner, specifically including:

determining different NLRSs for separate synchronization of multiple carriers in the synchronization base station;

obtaining, according to an NLRS for synchronization of one carrier, a synchronization level of the carrier; and comparing synchronization levels corresponding to the multiple carriers of the synchronization base station with the synchronization level of the synchronization base station, determining a lowest synchronization level as the synchronization level of the synchronization base station.

When the synchronization base station is a base station in an initialized state, and a synchronization level of the synchronization base station is determined in a following manner, specifically including:

determining a set maximum value of synchronization level in a communications network system; and using the determined maximum value of synchronization level as the synchronization level of the synchronization base station.

The controller 42 is specifically configured to search, according to a pre-established mapping relationship between a synchronization level and a resource for sending an NLRS, for a synchronization level of the second base station, corresponding to the resource that is obtained by listening by a listening module and used for sending the NLRS by the second base station.

The controller 42 is specifically configured to determine whether a difference between the synchronization level of the second base station and the synchronization level of the current base station is not greater than a set threshold; and when the difference between the synchronization level of the second base station and the synchronization level of the current base station is not greater than the set threshold, determine a synchronization level of the second base station lower than the synchronization level of the current base station.

Optionally, the synchronization base station further includes: a selector 45.

The selector 45 is configured to: before the NLRS sent by the second base station to maintain synchronization is periodically tracked, select, from second base stations whose determined synchronization levels are lower than the synchronization level of the current base station, a second base station having a lowest synchronization level as a synchronization source base station for synchronization tracking of the current base station.

Optionally, the device further includes: a memory 46.

The memory 46 is configured to: after the listening module obtains, through listening, a network listening reference signal NLRS sent by at least one second base station, configure the network listening reference signal NLRS that is sent by the at least one second base station and is obtained by listening in a multimedia broadcast multicast service single frequency network MBSFN subframe or a guard interval GP.

It should be noted that the signal receiver 41, the controller 42, the comparator 43, the signal transmitter 44, the selector 45, and the memory 46 are connected through a bus 47.

The device in Embodiment 9 of the present invention may be a logical unit in a base station, or may be a physical entity in a base station, or may be implemented in a software manner. When the device is applied to a base station, once the base station utilizes the functions in Embodiment 9 of the present invention, the base station may be a synchronization base station. The device may also be a network element entity on a side of a core network, which is not limited here.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for sending a synchronization signal, comprising:
   determining, by a base station according to a synchronization level of the base station, a resource for sending a network listening reference signal (NLRS), wherein the NLRS is used for clock synchronization between base stations; and
   sending, by the base station, the NLRS according to the determined resource; and
   listening, by a second base station, to the network listening reference signal NLRS sent by the base station,
   wherein the second base station is a multicarrier base station; and
   a synchronization level of the second base station is determined by:
   determining different NLRSs for separate synchronization of multiple carriers in the second base station;
   obtaining, according to an NLRS for synchronization of one carrier, a synchronization level of the carrier;
   comparing synchronization levels corresponding to the multiple carriers of the second base station with the synchronization level of the second base station, and determining a lowest synchronization level as the synchronization level of the second base station.

2. The method according to claim 1, wherein the determining, by the base station according to the synchronization level of the base station, the resource for sending the NLRS comprises:
   determining, by the base station according to the synchronization level of the base station and a mapping relationship between the synchronization level and a resource for sending an NLRS, the resource for sending the NLRS.

3. The method according to claim 2, wherein the mapping relationship between the synchronization level and the resource for sending an NLRS comprises that:
   different base stations having a same synchronization level use a same resource for sending an NLRS;

or, the resource determined by the base station is the same as a resource that is usable by another base station having a same synchronization level for sending an NLRS;

or, in the mapping relationship between the synchronization level and a resource for sending an NLRS, one synchronization level corresponds to only one resource for sending an NLRS;

wherein the resource comprises at least one of the following: a time domain resource, a frequency domain resource, and a code resource.

4. The method according to claim 2, wherein the resource comprises a time domain resource and a frequency domain resource; and the mapping relationship between the synchronization level and a resource for sending an NLRS comprises that:

time domain resources in resources for sending an NLRS by different base stations having a same synchronization level are different;

or, frequency domain resources in resources for sending an NLRS by different base stations having a same synchronization level are different;

or, the time domain resource and/or frequency domain resource determined by the base station is unusable by another base station having a same synchronization level;

or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

5. The method according to claim 1, wherein the sending, by the base station, the NLRS according to the determined resource comprises:

staying, by the base station when another base station having a same level sends an NLRS, silent on the determined resource;

and, sending, by the base station when the another base station having a same synchronization level stays silent, the NLRS on the determined resource.

6. A method for synchronization between base stations including a first base station and at least one second base station, the method comprising:

determining, by the at least one second base station according to a synchronization level of the base station, a resource for sending a network listening reference signal (NLRS), wherein the NLRS is used for clock synchronization between base stations;

sending, by the base station, the NLRS according to the determined resource;

listening, by the first base station, to the network listening reference signal NLRS sent by the at least one second base station;

determining a synchronization level of the second base station according to the determined resource that is obtained by listening and used for sending the NLRS by the second base station; and when the determined synchronization level of the second base station is lower than a synchronization level of the first base station, periodically tracking the NLRS sent by the second base station to maintain synchronization, wherein the first base station is a multicarrier base station; and the synchronization level of the first base station is determined in a following manner, comprising:

determining different NLRSs for separate synchronization of multiple carriers in the first base station;

obtaining, according to an NLRS for synchronization of one carrier, a synchronization level of the carrier;

comparing synchronization levels corresponding to the multiple carriers of the first base station with the synchronization level of the first base station, and determining a lowest synchronization level as the synchronization level of the first base station.

7. The method according to claim 6, after the synchronization level of the second base station is determined, and before the determined synchronization level of the second base station is lower than the synchronization level of the first base station, the method further comprising:

performing comparison to find whether the found synchronization level of the second base station is the same as the synchronization level of the first base station; and when the found synchronization level of the second base station is the same as the synchronization level of the first base station, determining that the second base station is a base station whose synchronization level is the same as that of the first base station; or when the found synchronization level of the second base station is different from the synchronization level of the first base station, determining that the second base station is a base station whose synchronization level is different from that of the first base station.

8. The method according to claim 7, after the determining that the second base station is the base station whose synchronization level is the same as that of the first base station, the method further comprising:

when the second base station sends the NLRS on the resource that is obtained by listening and used for sending the NLRS by the second base station, staying, by the first base station, silent on the resource that is obtained by listening and used for sending the NLRS by the second base station;

and, when the second base station stays silent on the resource that is obtained by listening and used for sending the NLRS by the second base station, sending, by the first base station, the NLRS on the resource that is obtained by listening and used for sending the NLRS by the second base station.

9. The method according to claim 7, after the determining that the second base station is the base station whose synchronization level is different from that of the first base station, the method further comprising:

when the second base station sends the NLRS on the resource that is obtained by listening and used for sending the NLRS by the second base station, staying, by the first base station, silent on the resource that is obtained by listening and used for sending the NLRS by the second base station, and sending data on another resource except the resource for the NLRS;

and, when the second base station stays silent on the resource that is obtained by listening and used for sending the NLRS by the second base station, sending, by the first base station, the NLRS on the resource that is obtained by listening and used for sending the NLRS by the second base station.

10. A synchronization source base station, comprising:

a processor, configured to determine a resource for sending a network listening reference signal NLRS according to a synchronization level of the source base station, wherein the NLRS is used for clock synchronization between base stations; and a signal transceiver, configured to send the NLRS according to the determined resource and a synchronization base station, wherein the synchronization base station is multicarrier base station; and a synchronization level of the synchronization base station is determined by:
- determining different NLRSs for separate synchronization of multiple carriers in the synchronization base stations;
- obtaining, according to an NLRS for synchronization of one carrier, a synchronization level of the carrier; and
- comparing synchronization levels corresponding to the multiple carriers of the synchronization base station with the synchronization level of the synchronization base station, and determining a lowest synchronization level as the synchronization level of the synchronization base station.

11. The synchronization source base station according to claim 10, wherein,
the processor is configured to determine the resource for sending the NLRS according to the synchronization level of the device and a mapping relationship between the synchronization level and a resource for sending an NLRS.

12. The synchronization source base station according to claim 11, wherein the mapping relationship between the synchronization level and a resource for sending an NLRS comprises that:
- different base stations having a same synchronization level use a same resource for sending an NLRS;
- or, the resource determined by the base station is the same as a resource that is usable by another base station having a same synchronization level for sending an NLRS;
- or, in the mapping relationship between the synchronization level and a resource for sending an NLRS, one synchronization level corresponds to only one resource for sending an NLRS;

wherein the resource comprises at least one of the following: a time domain resource, a frequency domain resource, and a code resource.

13. The synchronization source base station according to claim 11, wherein the resource comprises a time domain resource and a frequency domain resource; and
the mapping relationship between the synchronization level and a resource for sending an NLRS comprises that:
- time domain resources in resources for sending an NLRS by different base stations having a same synchronization level are different;
- or, frequency domain resources in resources for sending an NLRS by different base stations having a same synchronization level are different;
- or, the time domain resource and/or frequency domain resource determined by the base station is unusable by another base station having a same synchronization level;
- or, in the mapping relationship between the synchronization level and a resource for sending an NLRS, one synchronization level corresponds to at least two resources for sending an NLRS, and time domain resources and/or frequency domain resources in the at least two resources for sending an NLRS are different.

14. The synchronization source base station according to claim 10, wherein,
the signal transceiver is configured to stay silent on the determined resource when another base station having a same level sends an NLRS;
and, when the another base station having a same level stays silent, send the NLRS on the determined resource.

15. A system, comprising:
a source base station comprising:
- a processor, configured to determine a resource for sending a network listening reference signal NLRS according to a synchronization level of the source base station, wherein the NLRS is used for clock synchronization between base stations; and
- a signal transceiver, configured to send the NLRS according to the determined resource; and a synchronization base station comprising:
- a signal receiver, configured to listen to the network listening reference signal NLRS sent by at least one second base station comprising the source base station;
- a controller, configured to determine a synchronization level of the second base station according to a resource that is obtained by listening and used for sending the NLRS by the second base station, and when a synchronization level of the second base station is lower than a synchronization level of a current base station, periodically track the NLRS sent by the second base station to maintain synchronization, wherein the synchronization base station is a multicarrier base station; and a synchronization level of the synchronization base station is determined in a following manner, comprising;
determining different NLRSs for separate synchronization of multiple carriers in the synchronization base station;
obtaining, according to an NLRS for synchronization of one carrier, a synchronization level of the carrier; and
comparing synchronization levels corresponding to the multiple carriers of the synchronization base station with the synchronization level of the synchronization base station, and determining a lowest synchronization level as the synchronization level of the synchronization base station.

16. The system according to claim 15, wherein the synchronization base station further comprising:
a comparator, configured to: after the synchronization level of the second base station is determined, and before it is determined that the synchronization level of the second base station is lower than the synchronization level of the current base station, perform comparison to find whether the found synchronization level of the second base station is the same as the synchronization level of the current base station; and
when the found synchronization level of the second base station is the same as the synchronization level of the current base station, determine that the second base station is a base station whose synchronization level is the same as that of the current base station; or when the found synchronization level of the second base station is different from the synchronization level of the current base station, determine that the second base station is a base station whose synchronization level is different from that of the current base station.

17. The system according to claim 16, wherein the synchronization base station further comprising:
a signal transmitter, configured to: after it is determined that the second base station is a base station whose synchronization level is the same as that of the current base station, when the second base station sends the NLRS on the resource that is obtained by listening and used for sending the NLRS by the second base station, stay silent on the resource that is obtained by listening and used for sending the NLRS by the second base station;

and, when the second base station stays silent on the resource that is obtained by listening and used for sending the NLRS by the second base station, send the NLRS on the resource that is obtained by listening and used for sending the NLRS by the second base station.

18. The system according to claim 16, wherein the synchronization base station further comprises:

a signal transmitter, configured to: after it is determined that the second base station is a base station whose synchronization level is different from that of the first base station, when the second base station sends the NLRS on the resource that is obtained by listening and used for sending the NLRS by the second base station, stay silent on the resource that is obtained by listening and used for sending the NLRS by the second base station, and send data on another resource except the resource for the NLRS; and, when the second base station stays silent on the resource that is obtained by listening and used for sending the NLRS by the second base station, send the NLRS on the resource that is obtained by listening and used for sending the NLRS by the second base station.

* * * * *